(12) United States Patent
Hendricks

(10) Patent No.: US 11,554,863 B2
(45) Date of Patent: Jan. 17, 2023

(54) SYSTEM AND METHOD FOR FREQUENCY DOMAIN ROTOR MODE DECOMPOSITION

(71) Applicant: Textron Innovations Inc., Providence, RI (US)

(72) Inventor: Matthew Hendricks, Grand Prairie, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 991 days.

(21) Appl. No.: 16/181,694

(22) Filed: Nov. 6, 2018

(65) Prior Publication Data
US 2020/0140074 A1 May 7, 2020

(51) Int. Cl.
| B64C 27/51 | (2006.01) |
|---|---|
| B64C 27/08 | (2006.01) |
| G06F 17/16 | (2006.01) |
| B64C 27/00 | (2006.01) |
| G06F 17/14 | (2006.01) |

(52) U.S. Cl.
CPC ............ *B64C 27/51* (2013.01); *B64C 27/006* (2013.01); *B64C 27/008* (2013.01); *B64C 27/08* (2013.01); *G06F 17/142* (2013.01); *G06F 17/16* (2013.01)

(58) Field of Classification Search
CPC ..... B64C 27/51; B64C 27/006; B64C 27/008; B64C 27/08; G06F 17/142; G06F 17/16
See application file for complete search history.

(56) References Cited

U.S. PATENT DOCUMENTS

| 3,972,396 | A | * | 8/1976 | Bochnak | B64C 27/51 188/312 |
|---|---|---|---|---|---|
| 4,178,130 | A | * | 12/1979 | Ferris | B64C 27/51 416/107 |
| 8,955,792 | B2 | * | 2/2015 | Schank | G01D 5/145 244/17.13 |
| 9,304,516 | B2 | | 4/2016 | Christensen et al. | |
| 9,623,965 | B2 | | 4/2017 | Eglin | |
| 2011/0027083 | A1 | * | 2/2011 | Stamps | B64C 27/51 416/107 |
| 2011/0191040 | A1 | * | 8/2011 | Bechhoefer | B64C 27/008 702/56 |

(Continued)

FOREIGN PATENT DOCUMENTS

| CN | 103314336 A | 9/2013 |
|---|---|---|
| CN | 105460205 A | 4/2016 |

(Continued)

*Primary Examiner* — Richard R. Green
*Assistant Examiner* — Steven J Shur
(74) *Attorney, Agent, or Firm* — Slater Matsil, LLP

(57) ABSTRACT

A for providing control input adjustment for an aircraft, including one or more mode sensors disposed on an aircraft, a mode analysis system, the mode analysis system operable to receive mode sensor data from the one or more mode sensors, and operable to decompose the mode sensor data into decomposed mode data associated with fundamental modes of structural elements of the aircraft associated with the one or more mode sensors, and a flight control computer (FCC) disposed on the aircraft and connected to one or more actuators, the FCC operable to provide a control signal to the one or more actuators according to an association between the decomposed mode data and one or more rotorcraft parameters associated with the one or more actuators.

20 Claims, 13 Drawing Sheets

(56) References Cited

U.S. PATENT DOCUMENTS

2013/0275059 A1 10/2013 Bernhard et al.
2014/0374534 A1 12/2014 McCollough et al.
2015/0028152 A1 1/2015 Eller et al.
2017/0267338 A1* 9/2017 Garcia ..................... B64C 7/00

FOREIGN PATENT DOCUMENTS

WO 2009126626 A2 10/2009
WO 2016053408 A1 4/2016

* cited by examiner

US 11,554,863 B2

SYSTEM AND METHOD FOR FREQUENCY DOMAIN ROTOR MODE DECOMPOSITION

TECHNICAL FIELD

The present invention relates generally to a system and method for controlling a rotorcraft, and, in particular embodiments, to a system and method for analyzing sensor data, decomposing the sensor data into vibration mode data, and controlling the rotorcraft according to the vibration mode data.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload. The systems for engines, transmissions, drive system, rotors, and the like, are critical to the safe operation of the rotorcraft in flight. The elements of the systems operate at speeds where small deviations from expected performance can greatly affect flight characteristics, and should be closely monitored to ensure safe and optimized rotorcraft operation.

SUMMARY

An embodiment system for providing control input adjustment for an aircraft includes one or more mode sensors disposed on an aircraft, a mode analysis system, the mode analysis system operable to receive mode sensor data from the one or more mode sensors, and operable to decompose the mode sensor data into decomposed mode data associated with fundamental modes of structural elements of the aircraft associated with the one or more mode sensors, and a flight control computer (FCC) disposed on the aircraft and connected to one or more actuators, the FCC operable to provide a control signal to the one or more actuators according to an association between the decomposed mode data and one or more rotorcraft parameters associated with the one or more actuators.

An embodiment mode analysis system includes a processor, and a non-transitory computer-readable storage medium storing a program to be executed by the processor. The program includes instructions for receiving mode sensor data from one or more mode sensors, the mode sensor data indicating movement of structural elements of a rotorcraft associated with the one or more mode sensors, decomposing the mode sensor data into decomposed mode data associated with fundamental modes of the structural elements, and providing, to a flight control computer (FCC) disposed on the rotorcraft and connected to one or more actuators, result data associated with the decomposed mode data.

An embodiment method for controlling an aircraft includes receiving mode sensor data from one or more mode sensors, the mode sensor data indicating movement of structural elements of a rotorcraft associated with the one or more mode sensors, decomposing the mode sensor data into decomposed mode data associated with fundamental modes of the structural elements, providing, to a flight control computer (FCC) disposed on the aircraft and connected to one or more actuators, result data associated with the decomposed mode data, and providing, by the FCC, a control signal to the one or more actuators according to an association between the decomposed mode data and one or more rotorcraft parameters associated with the one or more actuators.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
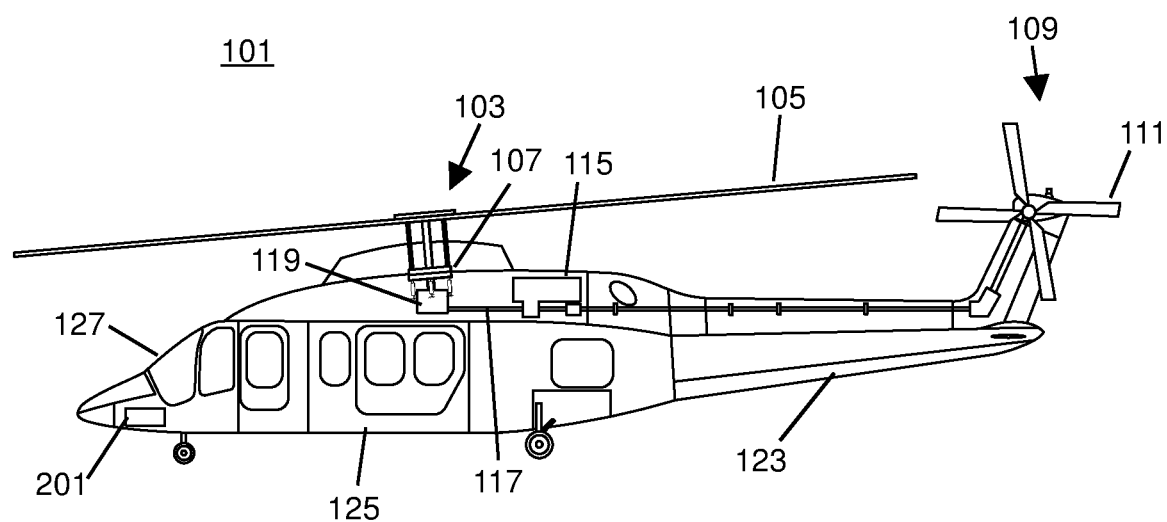
FIG. 1 illustrates a rotorcraft according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures provide for default or suggested control positioning, or the like.

Disclosed herein is a system and method for decomposition of sensor data to transform multiple measured inputs into distinct mode responses, with the FBW system using the mode responses to adjust automated flight processes or control inputs. Oscillatory signals for structural elements may be decomposed into constituent modes to determine structural modes such as rotor modes, airframe modes, or the like, so that responses may be extrapolated, and the rotorcraft controlled according to the modes or extrapolated responses that are correlated to rotorcraft parameters by the FBW system, control laws implemented by the FBW, or by a mode analysis system. Thus, the rotorcraft parameters may be adjusted or controlled to, for example, reduce vibration or improvise stability. Embodiments of the sensing and mode decomposition system disclosed herein permit analysis of modes and non-rotating modes with higher orders than simple first-order in-plane rotor modes. Higher order modes may be calculated, but may, in some embodiments, require more measurements than first order mode decomposition.

The mode analysis system provides sensing and mode decomposition that allows the decomposition of measured responses into fundamental modes. This decomposition may be applied to the decomposition of rotor modes or other structural modes. The algorithms used in the mode decomposition system provide fast and accurate mode decomposition in the telemetry stream, along with frequency scaling that can further improve awareness and understanding of the rotor response, thereby improving overall testing and operational safety.

Rotor modes may be calculated for a single blade (e.g. Myklestad) with the boundary conditions that are possible given the number of blades in the rotor (e.g. collective, cyclic, etc.). At the cyclic rotor natural frequencies, there are repeated roots. In addition, a 5 bladed rotor will have repeated scissors roots. For example, a 5-bladed rotor will have five in-plane first-order modes including one collective, two cyclic, and two scissor modes where the cyclic and scissor modes are repeated roots in the rotating system. The decomposition method provided by the mode analysis system allows the modes to be separated based on the blade phasing, even for identical frequencies.

Additionally, the decomposition method may be applied to non-traditional control system, such as rotating system controls, or individual blade controls. Thus, in some embodiments, the system may be applied to rotating systems, such as for main rotor blades or tail rotor blades, and a blade azimuth position may be measured if measurements are taken in a rotating system and control inputs are made in a fixed system. Similarly, the blade azimuth measurements may be taken if measurements are made in a fixed system and control inputs are made in the rotating system. Additionally, the blade azimuth measurement may be omitted if both measurement and control inputs are in the same fixed or rotating system. Thus, in some embodiments, the mode decomposition may be applied to systems other than in-plane rotor modes, such as fixed systems, non-plane rotating systems, or rotating systems other than rotors.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely. In yet other contemplated embodiments, rotorcraft 101 could be configured as an unmanned vehicle, in which case cockpit 127 could be eliminated entirely in order to save space and cost.

Figure 2:
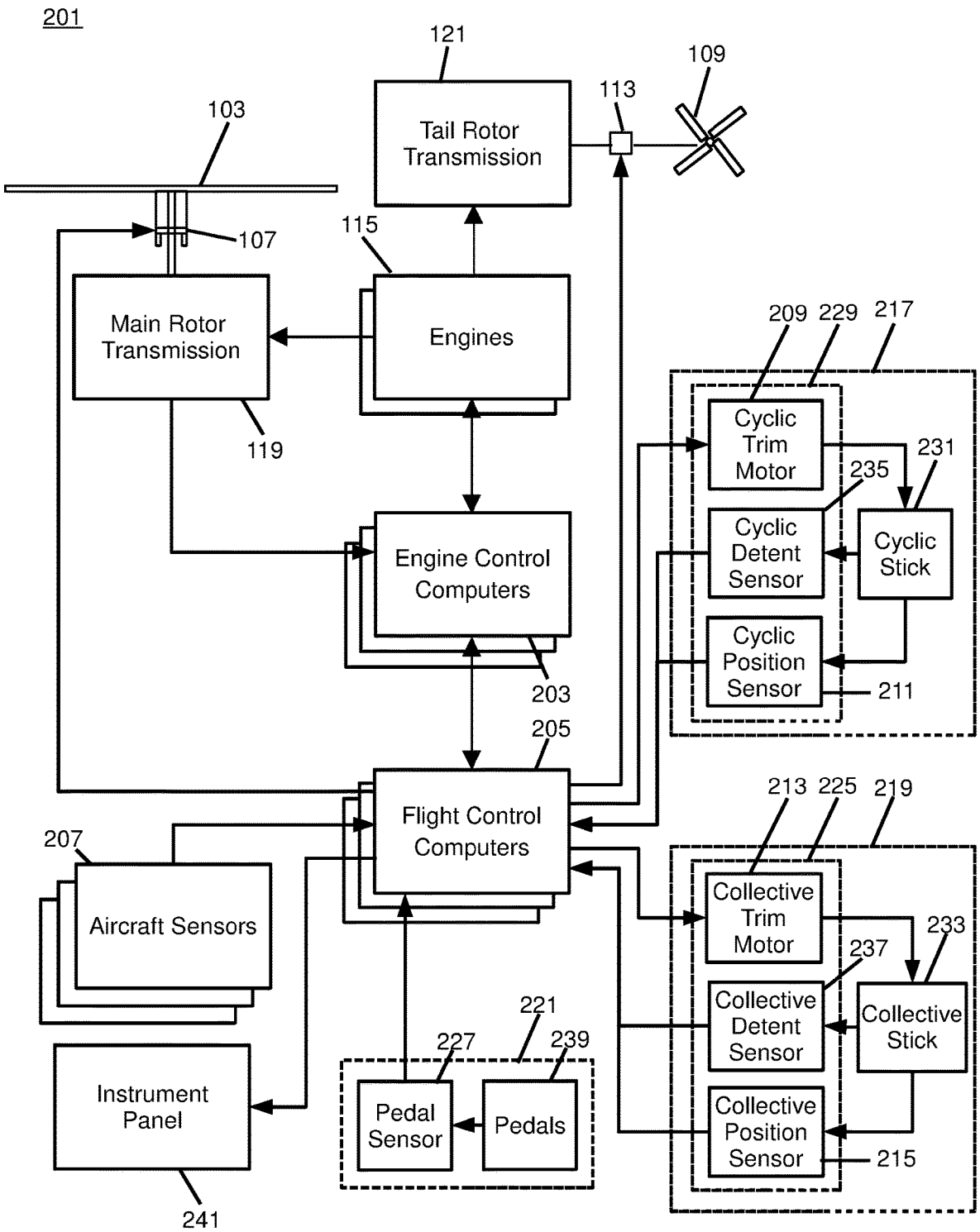
FIG. 2 illustrates a fly-by-wire flight control system for a rotorcraft according to some embodiments.

FIG. 2 illustrates a fly-by-wire flight control system 201 for a rotorcraft according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers (FCCs) 205, and aircraft sensors 207, which collectively adjust the flight control devices and monitors the rotorcraft during operation.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cues to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured revolutions per minute (RPM) of the main rotor blades.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The suggested cyclic stick position is a positon determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 206 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions. The cyclic and collective trim motors 209 and 213 may drive the cyclic stick 231 and collective stick 233, respectively, to suggested positions, but this movement capability may also be used to provide tactile cueing to a pilot. Additionally, the cyclic control assembly 217, collective control assembly 219 and/or pedal control assembly 221 may each have one or more detent sensors that determine whether the pilot is handling a particular control device. The FCCs 205 may provide different default control or automated commands to one or more flight systems based on the detent status of a particular stick or pilot control.

The aircraft sensors 207 may be in communication with the FCCs 205, and may include sensors for monitoring operation of the rotorcraft, providing pilot data, providing operational data, or the like, and may include measuring a variety of rotorcraft systems, operating conditions, flight parameters, environmental conditions and the like. For example, the aircraft sensors 207 may include sensors for gathering flight data, and may include sensors for measuring airspeed, altitude, attitude, position, orientation, temperature, airspeed, vertical speed, and the like. The aircraft sensors 207 may include sensors relying upon data or signals originating external to the rotorcraft, such as a global positioning system (GPS) sensor, a very high frequency (VHF) omnidirectional range sensor, Instrument Landing System (ILS), and the like. The aircraft sensors 207 may also include sensors for reading operational data such as vibration, device rotational speed, electrical operating characteristics, fluid flows, or the like.

In some embodiments, the aircraft sensors 207 may include mode system sensors such as movement sensors that may include displacement sensors, acceleration sensors, force sensors, vibration sensors, or another movement sensor, or may be stress sensors, or the like. In some embodiments, the FCCs 205 collect data from flight system 201 elements such as the mode system sensors for storage and later download, analysis, or the like. In other embodiments, mode system sensors may transmit data to a separate or standalone mode monitoring system that is implemented as a standalone system that communicates with, but that is operationally separate from, other elements of the flight control system 201. The FCCs 205 may store raw data from one or more aircraft components, and provides the raw data to a server for interpretation and analysis. In other embodiments, the FCCs 205 may interpret raw data to determine one or more condition indicators or modes from the mode sensor data for a server or other system that analyzes or displays the data. In yet another embodiment, the FCCs 205 may analyze the raw data or condition indicators to determine modes for one or more mode sensor sets of the aircraft sensors 207, and may control an automated flight process to, for example, reduce vibration or improve flight stability. The FCCs 205 may also detect a trend or problem indicated by mode sensor data, and may display or indicate the interpreted data, a warning, a system status, or like, on the instrument panel 241, on a dedicated display, through an audible warning, within another display such as a flight director display, though a tactile feedback system, or the like.

Figure 3A:
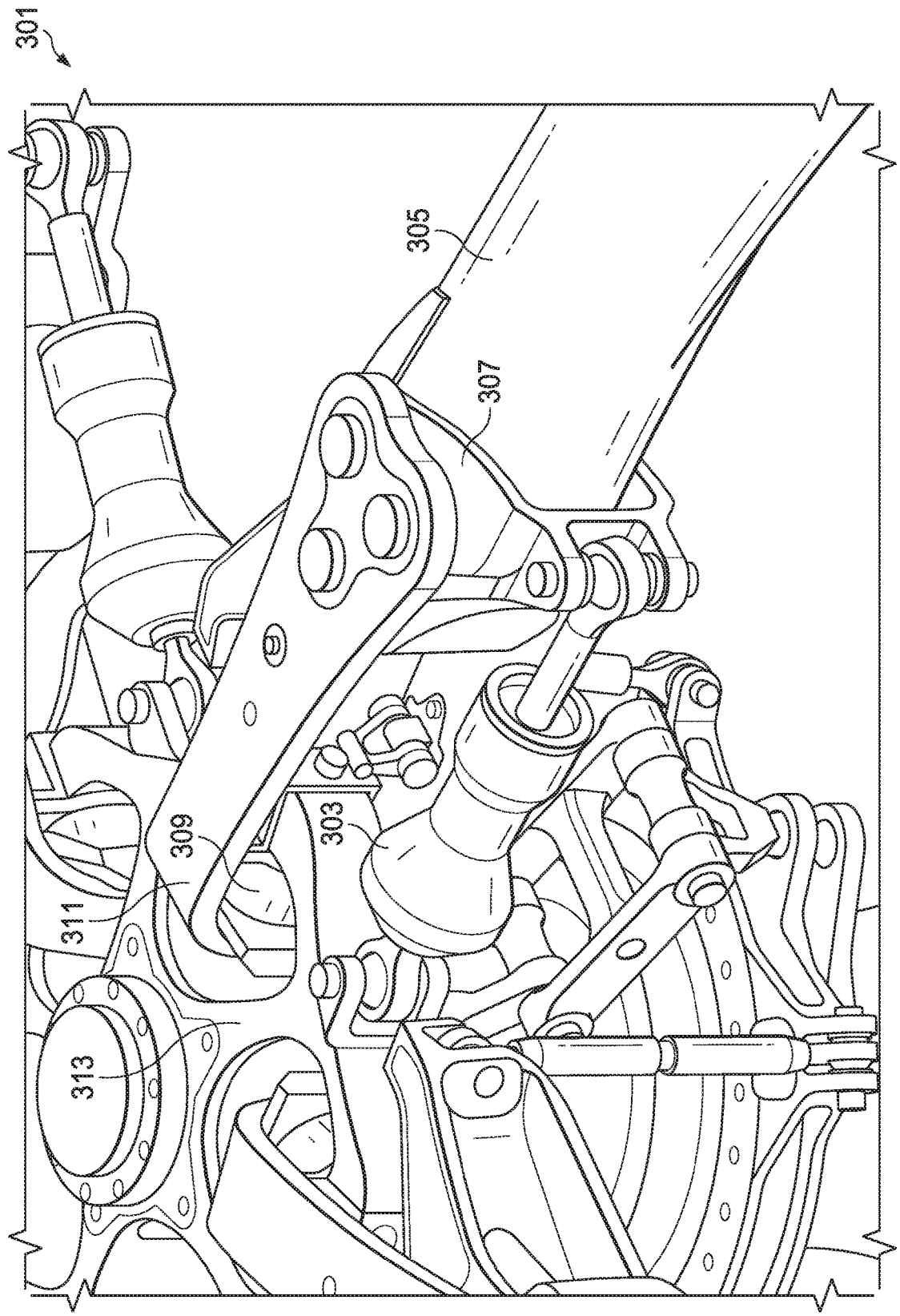
FIG. 3A illustrates a portion of a rotor head assembly having a lead-lag damper according to some embodiments.

FIG. 3A illustrates a portion of a rotor head assembly 301 having a lead-lag damper 303, according to some embodiments. The lead-lag damper 303 may provide movement data such as displacement data for rotor blades 305. In an embodiment of the rotor head assembly 301, the rotor blades 304 are attached to a yoke 313 by a grip 311. Lead or lag of a rotor blade 305 is movement forward or aft of the rotor blade attachment point to the yoke 313, while flapping is vertical movement of the rotor blade 6305 with respect to the main rotor hub. Additionally, cyclic movement of deflection may be pitching of the rotor blade 305 during flight. The flapping and lead or lag is facilitated by a hinge, coupling, bearing, or the like, that secures the main rotor blade to the main rotor hub. In some embodiments, a bearing 309 permits the rotor blade 305 to flap, or move up and down, and to lead or lag the rotor hub.

Movement of the rotor blade 305 may be measured by mode sensors. The mode sensors may be configured to measure the lead or lad of the rotor blade, the up or down flapping of the rotor blade 305, or the pitching of the rotor blade 305, a combination of these movements, or one or more other rotor blade characteristics. In some embodiments, a single mode sensor may be disposed on the main rotor hub to measure different movements of a single rotor blade 305. For example, mode sensors may be movement sensors that measure movement such as displacement of, for example, a lead-lag damper 303 for each rotor blade 305 on the rotorcraft. The movement sensor or displacement sensor may measure the flapping, pitching, and the lead or lag of the rotor blade 305 by measuring the extension of a shaft in the lead-lag damper 303. In some embodiments, the lead-lag damper 303 is connected between the yoke 313 and a pitch horn 307 that controls the rotor blade 305. Movement of the rotor blade 305 with respect to the yoke 313 is restrained by the bearing 309, and is dampened by the lead-lag damper 303, which may have a piston that extends of retracts to dampen movement of the rotor blade 305. The mode sensor may sense movement such as the displacement or the force or acceleration of movement of the lead-lag damper 303 piston, and report the movement as blade measurement data to the FCCs or the mode analysis system. Each rotor blade is associated with one or more mode sensors, and the mode sensors generate mode sensor data that may be decomposed into mode data, which may be used to adjust flight characteristics of the rotorcraft.

Figure 3B:
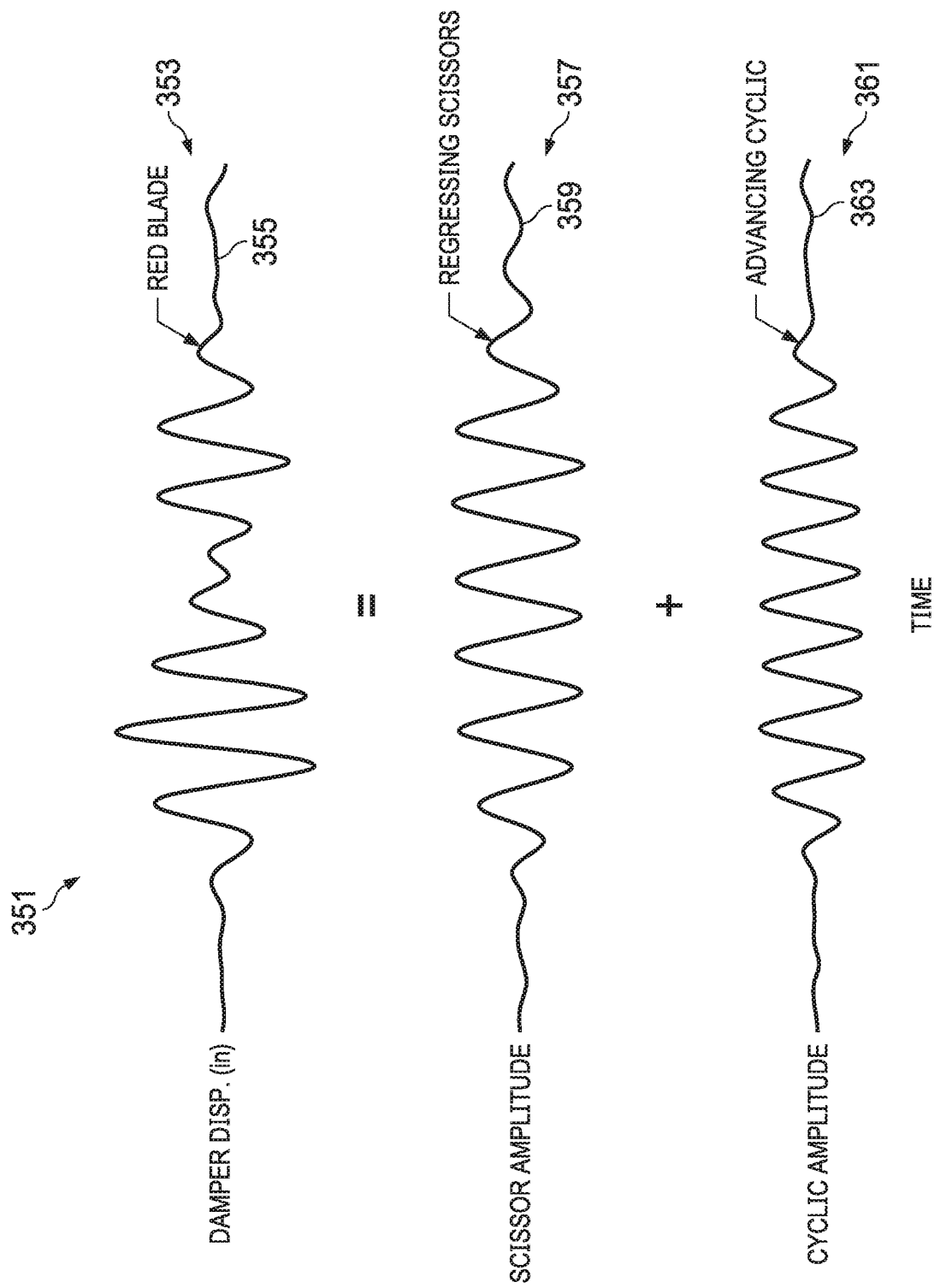
FIG. 3B is a set of graphs illustrating decomposition of rotor mode sensor data into first-order modes according to some embodiments.

FIG. 3B is a set of graphs 351 illustrating decomposition of rotor mode sensor data into first-order modes 359, 363 according to some embodiments. In these graphs 351, the movement data operated on is blade displacement data. Blade displacement graph 353 illustrates blade measurement data 355, and shows damper displacement over time, indicating cyclic mode senor readings for a single rotor blade. The blade measurement data 355 may be decomposed into constituent parts indicating different first-order modes 359, 363. For example, in some embodiments, the blade measurement data 355 may be decomposed into regressing scissors mode data 359 and advancing cyclic mode data 363. Regressing scissor mode chart 357 illustrates the amplitude of the regressing scissor mode data with respect to time, and advancing cyclic mode chart 361 illustrates the amplitude of the advancing cyclic mode data 363 with respect to time.

Figure 4A:
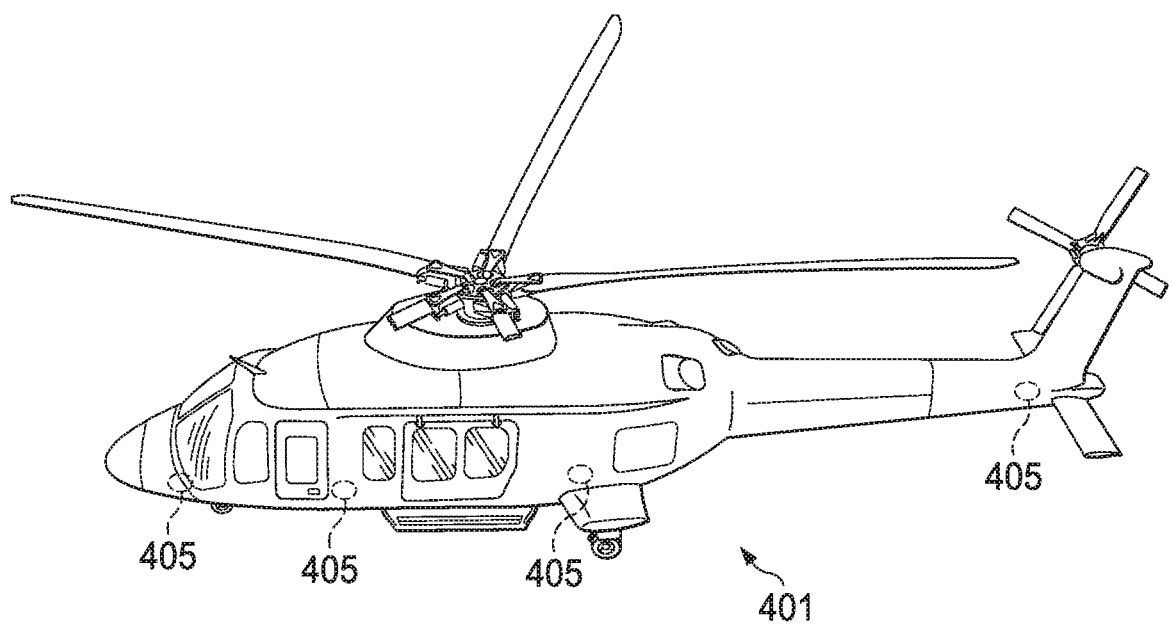
FIG. 4A illustrates placement of mode sensors on a rotorcraft in a mode decomposition system according to some embodiments.
Figure 4A:
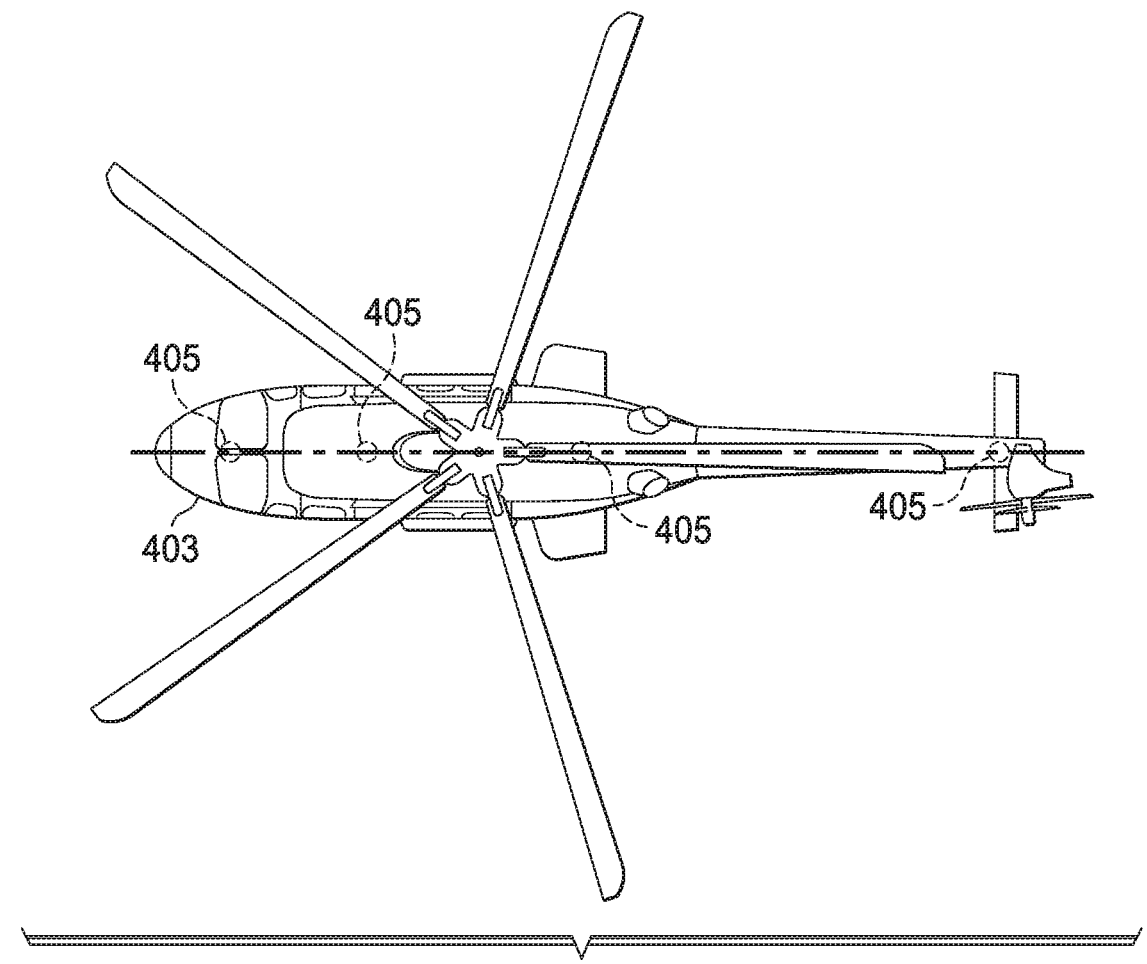

FIG. 4A illustrates placement of mode sensors 405 on a rotorcraft 403 in a mode decomposition system 401 according to some embodiments. In some embodiments, mode decomposition may be used to determine movement and modes of a rotorcraft body during flight. One or more mode sensors 405 may be disposed along, for example, a centerline 704 of a rotorcraft 403 and may be inertial sensors, movement sensors such as displacement sensors, force sensors, acceleration sensors, vibration sensors, or the like, that are configured to measure movement. Multiple mode sensors 405 disposed along the centerline 407 of the rotorcraft may generate linear mode sensor data that permits determination of total deflection of the body of the rotorcraft 403.

Figure 4B:
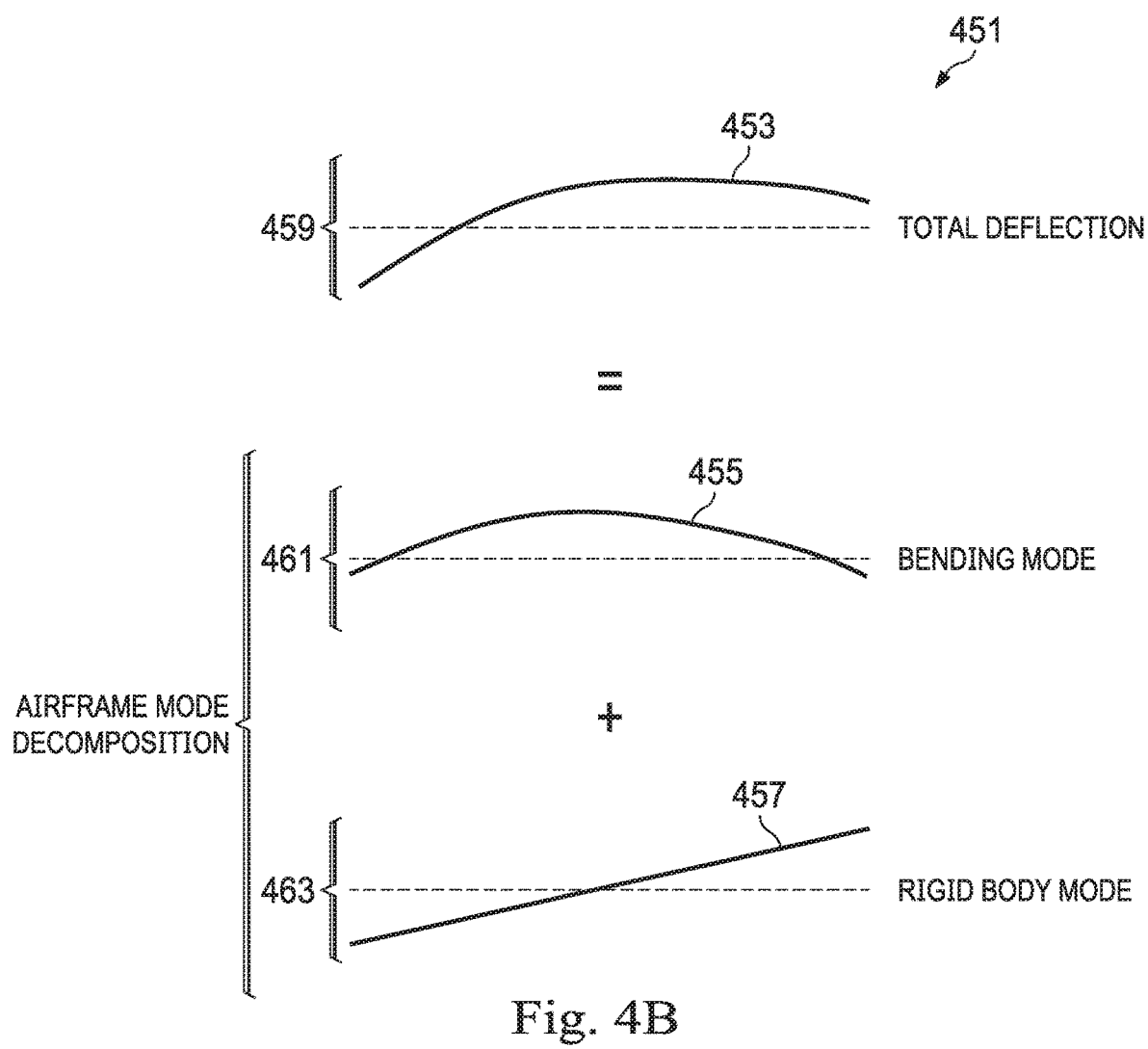
FIG. 4B is a set of graphs illustrating decomposition of linear mode sensor data into first-order modes according to some embodiments.

FIG. 4B is a set of graphs 451 illustrating decomposition of linear mode sensor data 453 into first-order modes 455, 457 according to some embodiments. In these graphs 451, the movement data operated on is blade displacement data. Blade displacement graph 459 illustrates linear mode sensor data 453, and shows mode sensor 405 displacement over time, indicating vibration or movement of mode sensors 405. The linear mode sensor data 453 may be decomposed into constituent parts indicating different first-order modes 455, 457. For example, in some embodiments, the linear mode sensor data 453 may be decomposed into bending mode data 455 and rigid body mode data 457. Bending mode chart 461 illustrates the amplitude of bending mode data 455 along the centerline 407 of the rotorcraft 403, and rigid body mode chart 463 illustrates the amplitude of the rigid body mode data 457 along the centerline 407 pf the rotorcraft 403. The bending mode data 455 may indicate flexing of the body of the rotorcraft 403, and the rigid body mode data 457 may indicate yawing of the body of the rotorcraft 403. Thus, the linear mode sensor data 453 may be decomposed to separately determine the factors contributing to movement in the body of the rotorcraft 403.

In some embodiments, the number of fundamental modes is equal to the number of rotor blades. For example, a 5 bladed rotor will have 5 lead-lag modes, including collective, regressing cyclic, regressing scissors, advancing scissors, and advancing cyclic.

For rotating systems such as rotor blade sets, the mode decomposition algorithm can be derived using the principal of superposition of modes. The measured responses may be assumed to be wholly due to the provided modes and are summed as unknown participation factors. The total response can be defined by a summation of all modes, which when limited to m modes, is described in terms of the mode shape and mode response by:

$$R_p(\omega, t) = \sum_{k=1}^{m} (A_k(t)e^{i\theta_k(t)})(\Phi_{k,p}e^{i\alpha_{k,p}}) \qquad (1)$$

where $R_p(\omega, t)$ is a complex number representing the magnitude and phase of the response at location p, m is the number of modes contributing to the p-th response location, $A_k$ is the amplitude of the k-th mode response, $\theta_k$ is the phase of the k-th mode response, $\Phi_{k,p}$ is the amplitude of the k-th mode shape at location p, $\alpha_{k,p}$ is the phase of the k-th mode shape at location p, t is time, and $\omega$ is the frequency of the excitation and system response. The terms $A_k(t)e^{i\theta_k(t)}$ and $$\Phi_{k,p}e^{i\alpha_{k,p}}$$

are complex numbers. The complex mode shape $$\Phi_{k,p}e^{i\alpha_{k,p}}$$

is constant in time, but the mode amplitude and phase response $A_k(t)e^{i\theta_k(t)}$ could vary in time in both amplitude and phase in response to the forcing function.

Assuming that a system includes m contributing modes and r measured response points, the modal contributions at each response point in r can therefore be rearranged into a matrix as shown below:

$$\begin{Bmatrix} R_1(\omega,t) \\ R_2(\omega,t) \\ \vdots \\ R_r(\omega,t) \end{Bmatrix} = \begin{bmatrix} \Phi_{1,1}e^{i\alpha_{1,1}} & \Phi_{2,1}e^{i\alpha_{2,1}} & \ldots & \Phi_{m,1}e^{i\alpha_{m,1}} \\ \Phi_{1,2}e^{i\alpha_{1,2}} & \Phi_{2,2}e^{i\alpha_{2,2}} & \ldots & \Phi_{m,2}e^{i\alpha_{m,2}} \\ \vdots & \vdots & \ddots & \vdots \\ \Phi_{1,r}e^{i\alpha_{1,r}} & \Phi_{2,r}e^{i\alpha_{2,r}} & \ldots & \Phi_{m,r}e^{i\alpha_{m,r}} \end{bmatrix} \begin{Bmatrix} A_1(t)e^{i\theta_1(t)} \\ A_2(t)e^{i\theta_2(t)} \\ \vdots \\ A_m(t)e^{i\theta_m(t)} \end{Bmatrix} \quad (2)$$

For a mode shape matrix that is square, or that has a same number of modes as response points, the modal amplitudes and phases $A_x(t)e^{i\Theta_x(t)}$ can be solved by inverting the complex matrix of mode shape constants. In some embodiments, for the case of rotor mode decomposition, the number of modes m is set equal to the number of response points r to ensure a square matrix. Thus, the mode response in time would therefore be $\mathcal{R}e\{A_k(t)e^{i\Theta_k}e^{i\omega t}\}$ at frequency ω. The mode shape constant matrix may be inverted according to:

$$\begin{Bmatrix} A_1(t)e^{i\theta_1(t)} \\ A_2(t)e^{i\theta_2(t)} \\ \vdots \\ A_m(t)e^{i\theta_m(t)} \end{Bmatrix} = \quad (3)$$

$$\begin{bmatrix} \Phi_{1,1}e^{i\alpha_{1,1}} & \Phi_{2,1}e^{i\alpha_{2,1}} & \ldots & \Phi_{m,1}e^{i\alpha_{m,1}} \\ \Phi_{1,2}e^{i\alpha_{1,2}} & \Phi_{2,2}e^{i\alpha_{2,2}} & \ldots & \Phi_{m,2}e^{i\alpha_{m,2}} \\ \vdots & \vdots & \ddots & \vdots \\ \Phi_{1,r}e^{i\alpha_{1,r}} & \Phi_{2,r}e^{i\alpha_{2,r}} & \ldots & \Phi_{m,r}e^{i\alpha_{m,r}} \end{bmatrix}^{-1} \begin{Bmatrix} R_1(\omega,t) \\ R_2(\omega,t) \\ \vdots \\ R_r(\omega,t) \end{Bmatrix}$$

In other embodiments where the mode shape matrix in Equation (2) is not a square matrix, such as in a rigid body system where the number of modes m does not equal the number of response points r, the system may be solved using the Moore-Penrose pseudoinverse provided there are more response points r than mode shapes m. Additionally, if there are missing response points (i.e. bad instrumentation), the corresponding rows may be removed from the transformation matrix, and a column from the transformation matrix can then be removed to maintain a square matrix. The removed column may correspond to a specific mode that may be less important to analysis of the decomposed modes, although this may result in a reduction in the accuracy of the analysis.

In some embodiments, the first-order modes of a rotor can be decomposed by defining the rotor mode shapes using Equation (3). The lead-lag modes of a rotor can be defined by the relative phasing between the blades. The number of first-order modes is equal to the number of rotor blades. For example, a 5 bladed rotor will have 5 lead-lag modes, including collective, regressing cyclic, regressing scissors, advancing scissors, and advancing cyclic.

As shown in Equation (2), the total phasing of the n-th blade due to the k-th mode is the sum of the mode phase response $\theta_k$ and the mode shape phase $\alpha_{k,p}$. The phase of a particular rotor mode shape is defined by a constant relative phasing of adjacent blades. The mode shape phasing is assumed to be positive for the n-th blade lagging the previous n−1 blade, with the order of the blades defined by blade passage sequence. Since the blade-to-blade phasing is constant for a given mode, the mode shape phase for a given blade and particular mode can be described as shown below in Equation (4), below. There are a total of N blades and m corresponding modes, where the phasing of the n-th blade due to the k-th mode depends on the blade number n and the blade-to-blade phasing $\Delta\theta_k$. In some embodiments, the mode shape phase for a given blade and mode is described according to:

$$\alpha_{k,n} = -(n-1)*\Delta\theta_k \quad (4)$$

where $\alpha_{k,n}$ is the mode shape phase for the n-th blade due to the k-th mode.

The rotor modes may be defined as an integer multiple of this periodic blade phasing for the k-th rotor mode as:

$$\Delta\theta_k = (k-1)\frac{360°}{N} \quad (7)$$

Using blade-to-blade phasing sign conventions, Equation (7) may be used to describe each rotor mode. For example, on a 4 bladed rotor, the $2^{nd}$ rotor mode would have a blade-to-blade phasing of $$\Delta\theta_2 = (2-1)\frac{360°}{4} = 90°$$

where the green blade (second blade) lags the red blade (first blade) by 90°, which is the regressing cyclic mode. Table 1 summarizes the blade-to-blade phasing and associated mode descriptions for 3, 4, and 5 bladed rotors.

TABLE 1

Lead-Lag $1^{st}$ Order Rotor Mode Descriptions for 3, 4, and 5 Bladed Rotors

| Rotor Mode | 3 Bladed Rotor | | 4 Bladed Rotor | | 5 Bladed Rotor | |
|---|---|---|---|---|---|---|
| | Description | Phasing | Description | Phasing | Description | Phasing |
| $\Delta\theta_1$ | Collective | 0° | Collective | 0° | Collective | 0° |
| $\Delta\theta_2$ | Reg. Cyclic | 120° | Reg. Cyclic | 90° | Reg. Cyclic | 72° |
| $\Delta\theta_3$ | Adv. Cyclic | −120° | Scissors | 180° | Reg. Scissors | 144° |
| $\Delta\theta_4$ | | | Adv. Cyclic | −90° | Adv. Scissors | −144° |
| $\Delta\theta_5$ | | | | | Adv. Cyclic | −72° |

Combining Equations (4) and (7), the mode shape phase $\alpha_{k,n}$ for the n-th blade due to the k-th mode may be defined by:

$$\alpha_{k,n} = -(n-1)(k-1)\frac{360°}{N} \quad (8)$$

For lead-lag first-order rotor modes, Equation (8) can be combined with Equation (3) to perform rotor mode decomposition. Since the blades are assumed to be identical, the same mode shape amplitude $\Phi_{k,p}$ can be assigned to each blade. In some embodiments, an amplitude of unity, or 1, is used. Therefore, an N bladed rotor lead-lag response can be decomposed according to:

$$\begin{Bmatrix} A_1(t)e^{i\theta_1(t)} \\ A_2(t)e^{i\theta_2(t)} \\ \vdots \\ A_N(t)e^{i\theta_N(t)} \end{Bmatrix} = \begin{bmatrix} 1 & 1 & \cdots & 1 \\ 1 & e^{-i\frac{2\pi}{N}} & \cdots & e^{-i(N-1)\frac{2\pi}{N}} \\ \vdots & \vdots & \ddots & \vdots \\ 1 & e^{-i(N-1)\frac{2\pi}{N}} & \cdots & e^{-i(N-1)(N-1)\frac{2\pi}{N}} \end{bmatrix}^{-1} \begin{Bmatrix} R_1(\omega,t) \\ R_2(\omega,t) \\ \vdots \\ R_N(\omega,t) \end{Bmatrix} \quad (9)$$

In some embodiments, it may be useful to apply the transformation or decomposition at all frequencies at the same time. While foregoing equations deal with calculating the mode decomposition at discrete frequencies, the techniques may also be used as the basis for decomposition of mode data at a group or range of frequencies, including all frequencies. In some embodiments, this is accomplished using the Discrete Fourier Transform and its inverse to reconstruct a time-based signal that represents each of the responses of the modes. This method is referred to as the offline algorithm.

Figure 5:
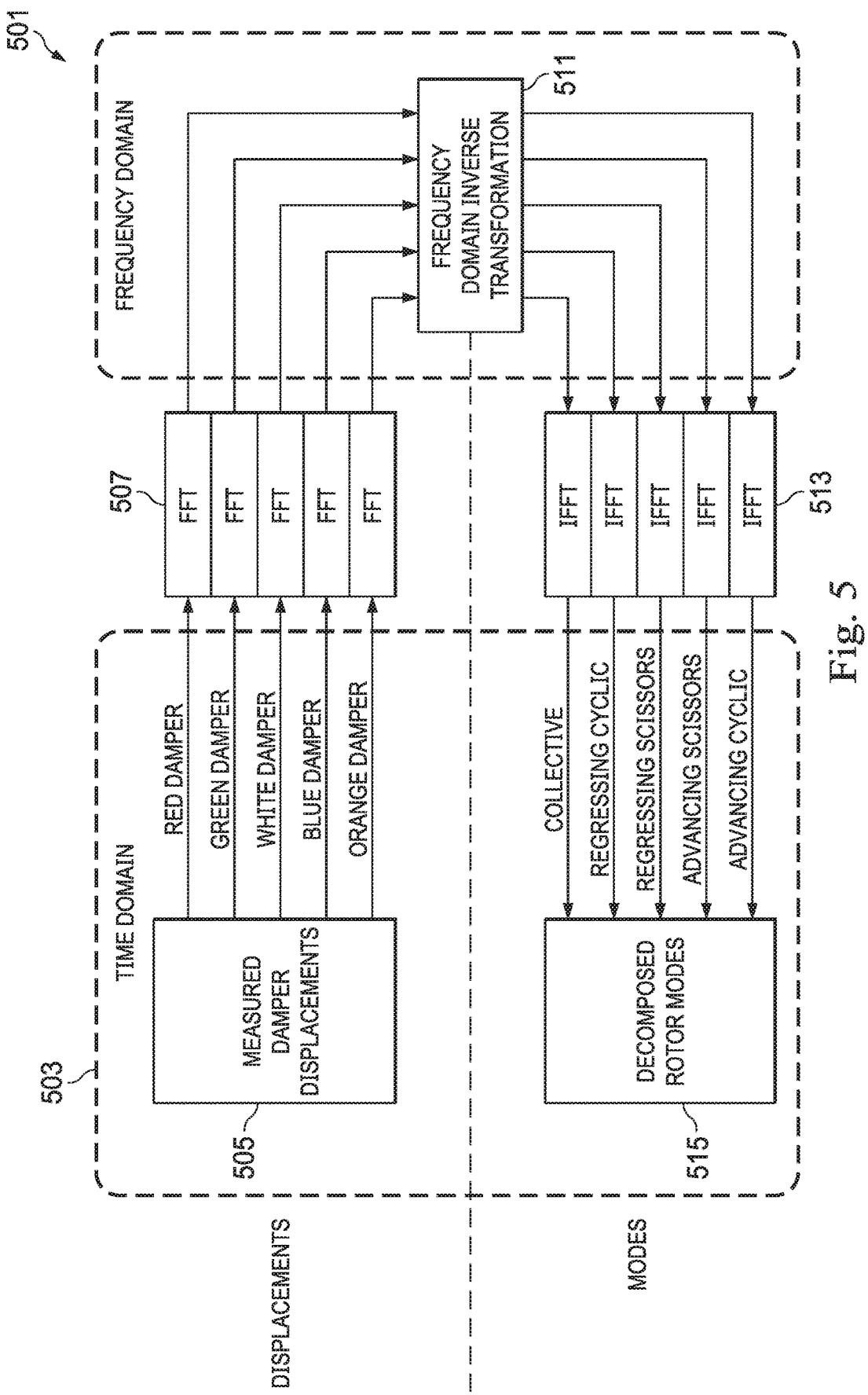
FIG. 5 is a flow diagram illustrating a frequency mode decomposition process according to some embodiments.

FIG. 5 is a flow diagram illustrating a frequency mode decomposition process 501 according to some embodiments. The discrete Fourier transform of each blade response is calculated so that the time responses can be converted into the frequency domain, typically using fast Fourier transform (FFT) algorithms to improve the computational speed. Thus, measured data 505 in the time domain 503, such as data for measured damper displacements, is received from one or more mode sensors. An FFT 507 is applied to the measured data 505 to transform the measured data into frequency domain data.

Once each of the blade responses has been transformed into the frequency domain 509 via the FFT 507, the results can be assembled into an $N \times N_S$ matrix with the n-th row corresponding to the n-th rotor blade where N is the number of rotor blades and $N_S$ is the number of samples. Each column of this matrix corresponds to a specific frequency bin from the performed FFT. Therefore, each individual column of this matrix is equivalent to the response vector in Equation (9), where the frequency of ω is equivalent to the frequency of the FFT bin. The mode response is then calculated using a frequency domain inverse transformation 511. In some embodiments, the frequency domain inverse transformation is performed using a transformation by multiplication of the inverse transformation matrix ($N \times N$) with this $N \times N_S$ matrix from the FFT 507, as shown in Equation (11) where the k-th row corresponds to the k-th rotor mode response.

$$\begin{Bmatrix} M_1(0) & M_1(\Delta f) & M_1(2\Delta f) \\ M_2(0) & M_2(\Delta f) & M_2(2\Delta f) & \cdots \\ \vdots & \vdots & \vdots \\ M_N(0) & M_N(\Delta f) & M_N(2\Delta f) \end{Bmatrix} = \quad (11)$$

$$\begin{bmatrix} 1 & 1 & \cdots & 1 \\ 1 & e^{-i\frac{2\pi}{N}} & \cdots & e^{-i(N-1)\frac{2\pi}{N}} \\ \vdots & \vdots & \ddots & \vdots \\ 1 & e^{-i(N-1)\frac{2\pi}{N}} & \cdots & e^{-i(N-1)(N-1)\frac{2\pi}{N}} \end{bmatrix}^{-1}$$

$$\begin{Bmatrix} R_1(0) & R_1(\Delta f) & R_1(2\Delta f) \\ R_2(0) & R_2(\Delta f) & R_2(2\Delta f) & \cdots \\ \vdots & \vdots & \vdots \\ R_N(0) & R_N(\Delta f) & R_N(2\Delta f) \end{Bmatrix}$$

where $M_k(\omega)$ is the k-th complex mode response and $R_n(\omega)$ is the n-th complex blade response at frequency ω. The complex mode response matrix is $N \times N_S$, the inverse transformation matrix is $N \times N$, and the complex blade response matrix is $N \times N_S$.

After the complex mode responses have been calculated in the frequency domain 509, the mode responses may be converted back into the time domain using the Inverse Fourier Transform 513 (IFFT). Since real time history data is used, as opposed to complex time history data, the frequency domain mode responses above the Nyquist frequency should be conjugate symmetric to the responses below the Nyquist frequency. This can be ensured either through directly modifying the data values, or by using the complex conjugate of the inverse transformation matrix for values above the Nyquist frequency.

The resulting decomposed rotor mode data 515 should contain only real values and will have the same number of samples as the input data. Each row of data contains the time history of each rotor mode, while each column corresponds to a point in time.

While the Offline Algorithm described works on a complete set of collected data, in some embodiments, a modified version of the frequency mode decomposition process described above allows for real-time or near real-time processing in order to support flight telemetry monitoring, and in some embodiments, may also be used by controls laws of the rotorcraft for vibration control and stability enhancement processes. The real-time frequency mode decomposition process may use a small buffer that contains a queue of the streaming data.

Figure 6:
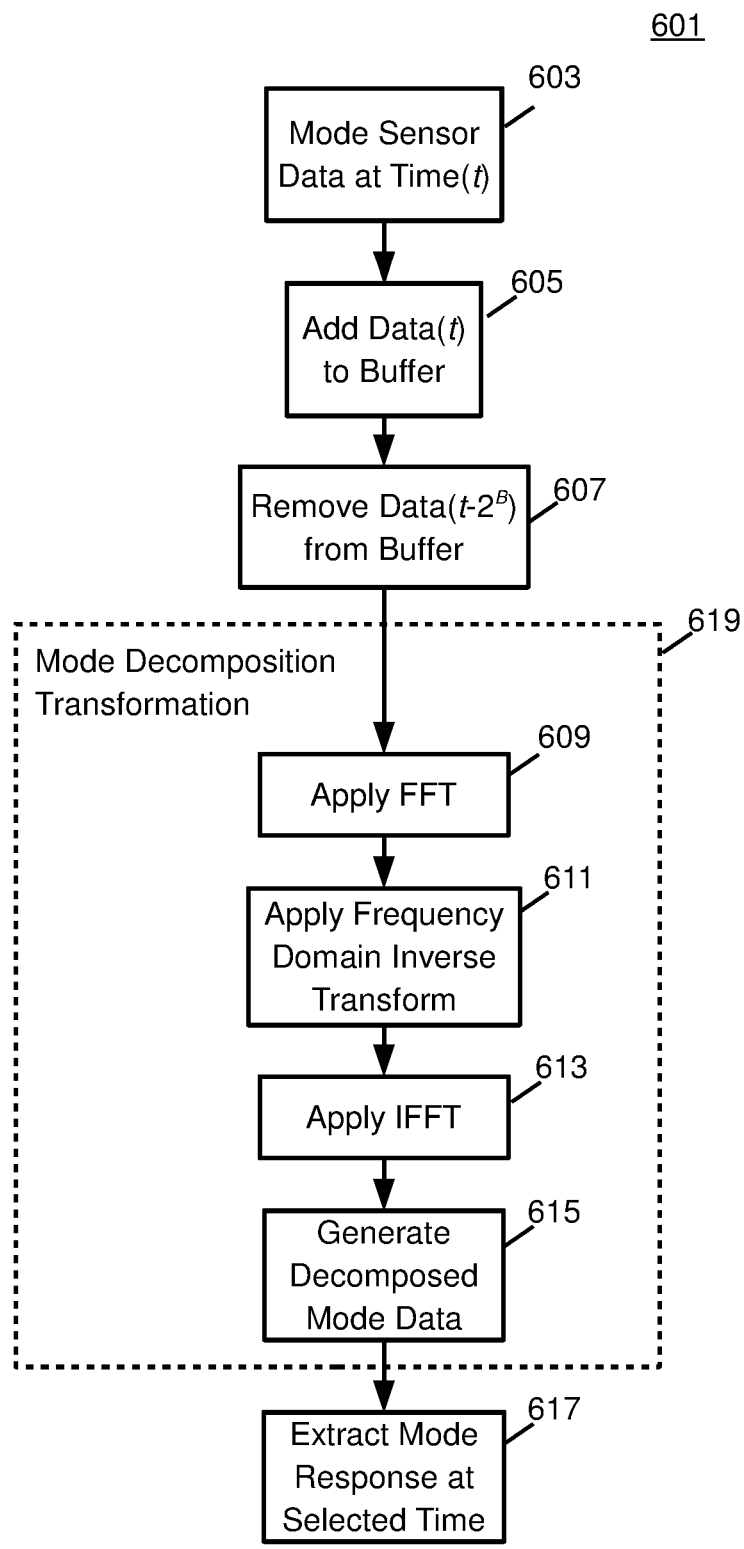
FIG. 6 is a flow diagram illustrating a real-time frequency mode decomposition process 601 according to some embodiments.

FIG. 6 is a flow diagram illustrating a real-time frequency mode decomposition process 601 according to some embodiments. An $N \times 2^B$ buffer may be used to store mode sensor for application of the where N is the number of rotor blades (or measured responses) and $2^B$ is the buffer size. In block 603, mode sensor data in a data stream is received as data(t) at time t. As data is measured and recorded from the data stream, the buffer is updated to include the new data. In block 605, the new values of data(t) are added to the end of the buffer, and in block 607, while the oldest values in the buffer, data $(t-2^B)$, are removed from the front of the buffer. The mode decomposition transformation 619 is then applied to the data in the buffer. In some embodiments, the mode decomposition transformation 619 includes a process similar to the Offline algorithm using the data in the buffer instead of a complete data set. For example, in block 609, the FFT is applied to the data buffer to generate frequency domain data, and the frequency domain inverse transform is applied to the frequency domain data in block 611 to generate transformed frequency data. In block 613, an IFFT is applied to the transformed frequency data to generate decomposed mode data 615 in the time domain. In block 617, a single column is extracted from the resulting time domain decomposition mode data, representing the mode response at that point in time. In some embodiments, a time is selected that not near the beginning or end of the buffer due to significant phase distortions that can develop. Typically, the point in the center of the buffer is chosen, which will introduce a time delay τ in seconds, which may be given by.

$$\tau = \frac{2^B}{2 \times F_s} = \frac{2^{B-1}}{F_s} \quad (12)$$

The algorithm is implemented to efficiently compute the FFT on the streaming data using a minimum size buffer. Additional improvements in computation time can be achieved through the use of the sliding discrete Fourier transform method.

Increasing the buffer size improves the accuracy of the algorithm at the cost of additional computational time required for the larger FFT. Additionally, higher sample rates may decrease the accuracy of the algorithm such that larger buffers are required to offset the errors.

In some embodiments, it may be desirable to monitor a mode response such as rotor response at frequencies other than the true natural frequency. For example, for soft in-plane rotors, the natural frequency can be very low and can make it difficult to assess things like damping and growth in response due to the low number of cycles within a given amount of time. Additionally, for real-time monitoring, trends in the rotor need to be quickly assessed for any divergence or unexpected growth.

Frequency scaling for a time domain rotor mode decomposition algorithm may be used to improve monitoring. For in-plane modes, the rotating system modes are transformed to rotation-independent reference frame. In this transformation, the collective mode does not change frequency, the advancing cyclic mode shifts by +1P, and the regressing cyclic mode shifts by −1P. On a four bladed rotor, the last remaining scissors mode does not change frequency. On a five bladed rotor, the advancing scissors mode shifts by +2P and the regressing scissors mode shifts by −2P. This time domain decomposition technique may naturally have higher frequencies in this rotation-independent reference frame than the rotating system. Due to the potential benefits of having higher frequency responses, this frequency scaling is implemented in the frequency domain decomposition to improve in combination with calculating blade phasing information.

In some embodiments, the frequency shifting in the frequency domain uses the product-to-sum identities of trigonometric equations. If we assume that the decomposed signal is made up of cosine terms with varying amplitudes and phases, the following can be applied at a specific frequency $\omega$:

$$\cos(\omega t + \phi)\cos c\psi = \frac{1}{2}[\cos(\omega t + \phi - c\psi) + \cos(\psi t + \phi + c\psi)] \quad (14)$$

$$\sin(\omega t + \phi)\sin c\psi = \frac{1}{2}[\cos(\omega t + \phi - c\psi) - \cos(\omega t + \phi + c\psi)] \quad (15)$$

where $c\psi$ is an input signal representing some integer multiple of the blade azimuth and $\phi$ is an arbitrary phase lead.

Combining Equations (14) and 15), shifting the input response by a specific frequency may be performed according to:

$$\cos(\omega t+\phi)\cos c\psi - \sin(\omega t+\phi)\sin c\psi = \cos(\omega t+\phi+c\psi) \quad (16)$$

The input signal by $c\psi$ can be modulated by phase shifting the input signal by −90° for the sine component. This can be achieved through a multiplication of the FFT data (in real/imaginary format) by the imaginary unit i.

In some embodiments, the inverse transformation and subsequent frequency shifts are performed by performing phase shifting of the input data, for example, by doubling the number of rows in the inverse transformation matrix and storing the multiplication of the original matrix with the imaginary unit i as the lower half of the matrix.

Figure 7:
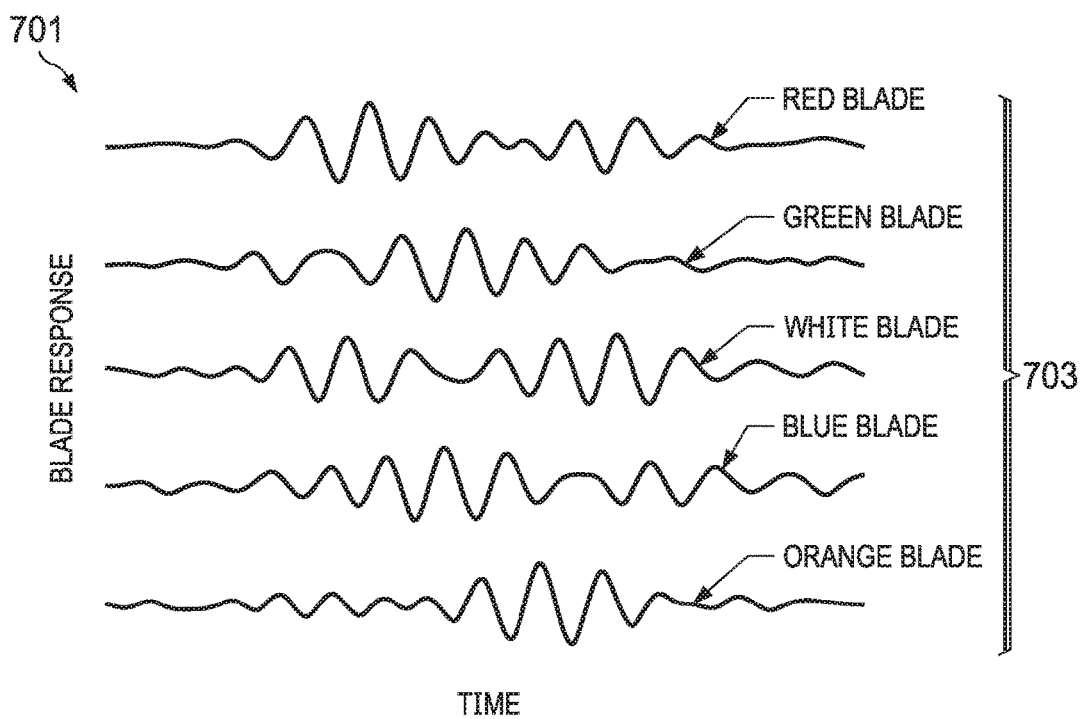
FIG. 7 is a chart illustrating below shows a damper response data for each blade during a test excitation according to some embodiments.

FIG. 7 is a chart 701 illustrating below shows example damper response data 703 for each blade for comparison of the three different mode decomposition systems (Offline, Real-Time, Frequency Scaling).

Figure 8A:
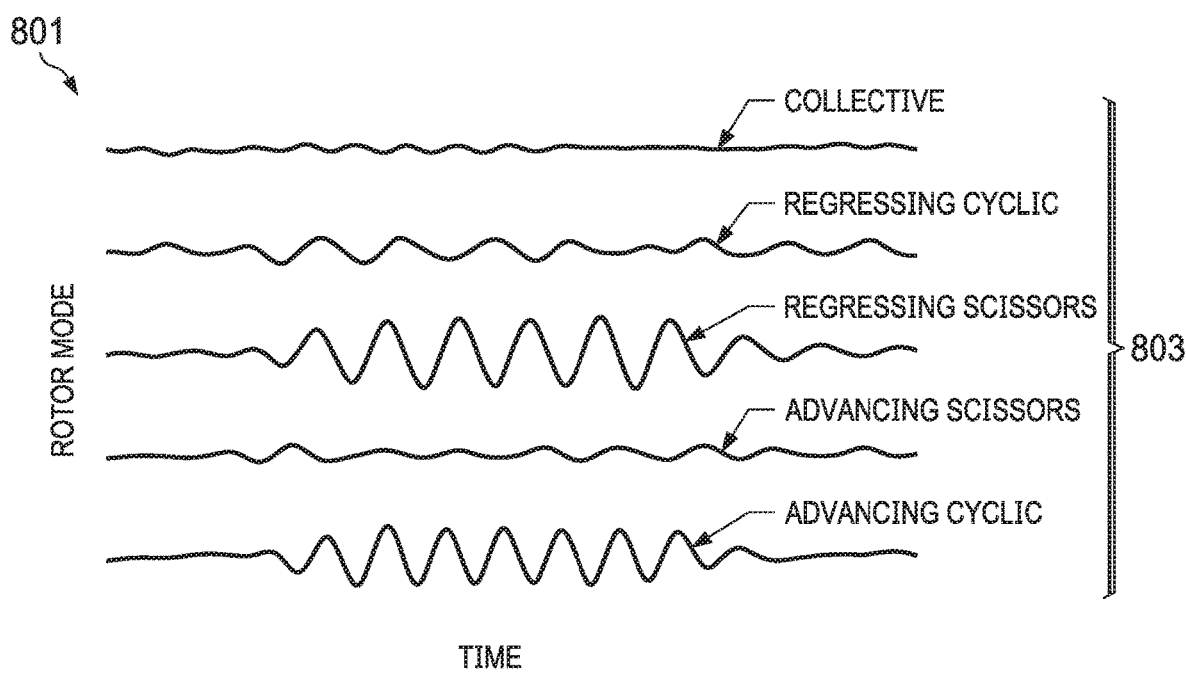
FIG. 8A is a chart illustrating mode data generated using the Offline Algorithm according to some embodiments.

FIG. 8A is a chart 801 illustrating mode data 803 generated using the Offline Algorithm according to some embodiments. The plot shows a significant regressing scissors response 805 and advancing cyclic response 807, although at two distinct frequencies. The difference in frequencies causes the beating that is seen in the FIG. 7 damper responses and is due to aerodynamic sideband interactions. Without the aid of a decomposition algorithm, this interaction may appear to be a poor quality rotor response, although positive damping could still be assessed.

Figure 8B:
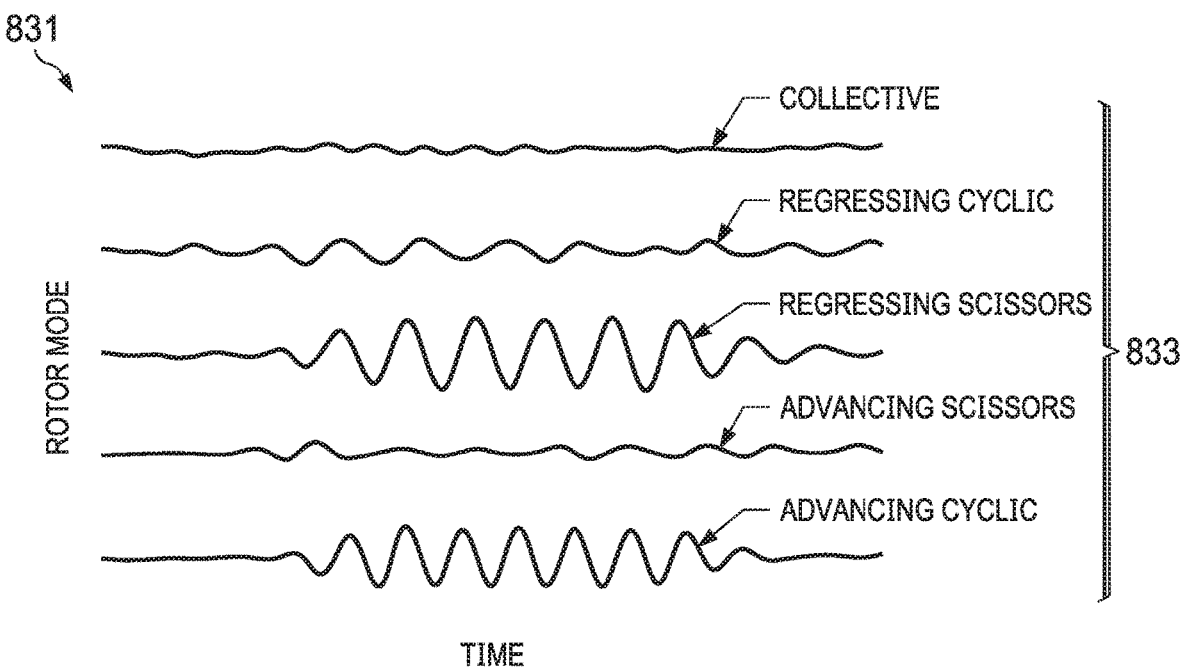
FIG. 8B is a chart illustrating mode data generated using the Real-Time Algorithm according to some embodiments.

FIG. 8B is a chart 831 illustrating mode data 833 generated using the Real-Time Algorithm according to some embodiments. In the ideal case, this Real-Time Algorithm would produce the same response data set generated by the Offline Algorithm, as shown in FIG. 8B, although with an introduced time delay as defined by Equation (12). The mode data 833 may have some delay due to the buffer used in the real-time mode decomposition.

Figure 8C:
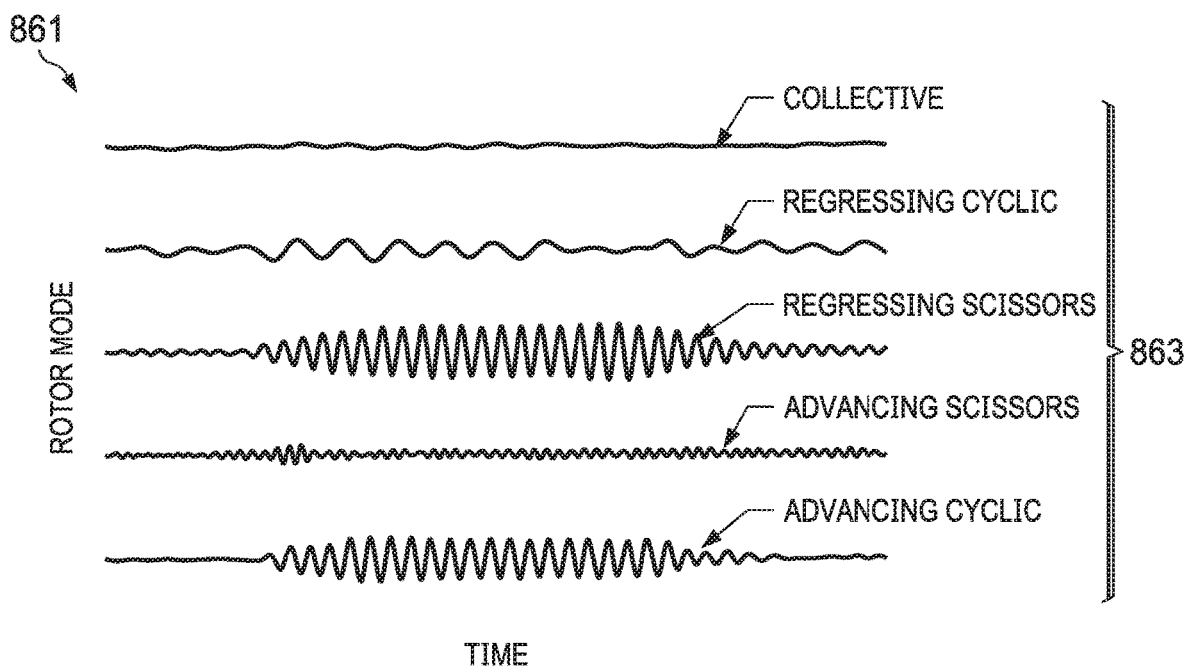
FIG. 8C is a chart illustrating mode data generated using the Offline Algorithm with Frequency Scaling according to some embodiments.

FIG. 8C is a chart 861 illustrating mode data 863 generated using the Offline Algorithm with Frequency Scaling according to some embodiments. Filtering ranges were selected based on the test rotorcraft. In some embodiments, the different modes may be filtered individually, for example, by filtering each mode around their respective expected scaled frequencies, and frequency scaling one or more of the mode responses. The frequency scaling option is shown here for the offline algorithm for illustration but can also be applied to the real-time algorithm for monitoring during testing. The higher frequency representation of rotor motions can reduce the time required for telemetry personnel to recognize a response that requires knock-it-off action.

Figure 9:
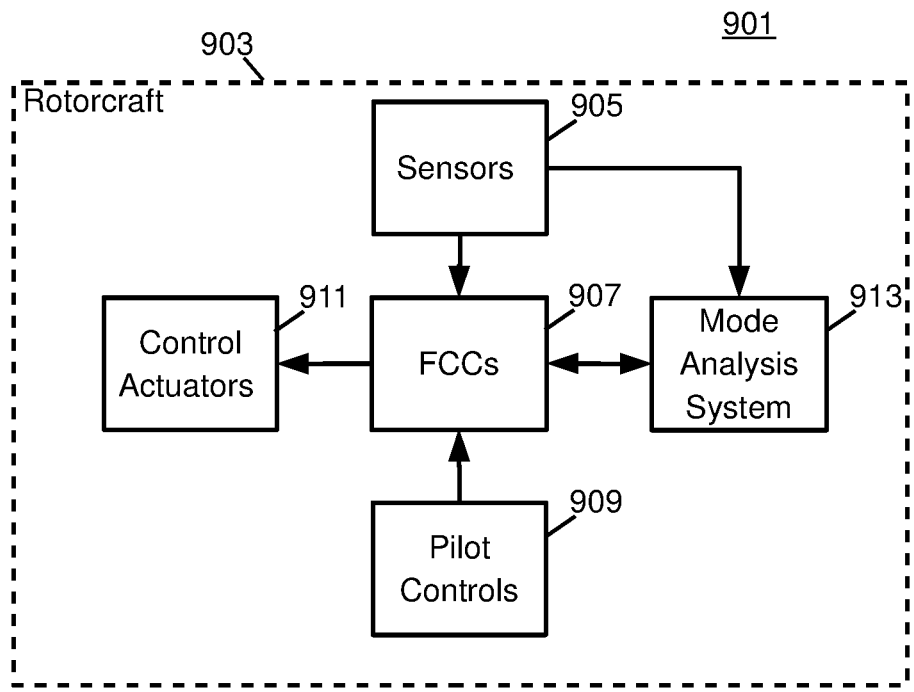
FIG. 9 is a diagram illustrating an onboard mode decomposition and compensation system of a rotorcraft according to some embodiments.

FIG. 9 is a diagram illustrating an onboard mode decomposition and compensation system 901 of a rotorcraft 903 according to some embodiments. In some embodiments, a rotorcraft may have a system that analyzes rotor modes or structural modes in real time using, for example, the real-time mode decomposition system described above.

In some embodiments, the decomposition and compensation system 901 is disposed in the rotorcraft 903, and may include a mode analysis system 913 that receives signals directly from the sensors 905, or from the FCCs 907. Signals received from the sensors 905 may be raw mode sensor data that in the form of movement readings or displacement readings that are sent from the lead-lag dampers, or may be processed or raw signals sent from a sensor management device that may process or package the sensor readings into a format usable for by the mode analysis system 913. In other embodiments, the mode analysis system 913 receives mode sensor data from the FCCs 907. The FCCs may provide raw or processed mode sensor data to the mode analysis system 913.

In some embodiments, the mode analysis system 913 uses the mode sensor data, whether raw or processed, as streaming data for the real-time mode decomposition process. In some embodiments, the mode analysis system 913 or FCCs 907 may use the mode decomposition results obtained by the mode analysis system 913 to correlate or associate the determined rotor modes with one or more rotorcraft parameters such as control inputs, control parameters, or flight parameters and may adjust or determine the rotorcraft parameters according to the mode data. Control inputs may include pilot or automated system inputs to controls, and the FCCs 907 may adjust or modify the rotorcraft's reaction to, or implementation of, a control input in response to a control input adjustment determined by the mode analysis system 913 or FCCs 907. In some embodiments, the control parameters may include engine power or torque, collective settings, cyclic settings, yaw or tail rotor thrust, or the like, and flight parameters may include airspeed, rate of climb or descent, attitude, altitude, or the like. In some embodiments, the control adjustments are associated with a magnitude of an associated rotor mode, or the associated rotor mode exceeding a threshold, or the like.

The FCCs 907 may adjust or modify the rotorcraft's reaction to, or implementation of, a control input in response to a control input adjustment being determined by the mode analysis system 913 or FCCs 907. In some embodiments, the FCCs 907 generate an adjustment for a rotorcraft parameter according to the rotorcraft parameter associated with the identified mode. The FCCs 907 may adjust a flight parameter by generating or modifying a command to one or more control actuators 911, for example, by generating a correcting command, or by modifying or adjusting a command generated according to an input from a pilot control 909 or as part of an automated process running on the FCCs 907 or another rotorcraft system.

For example, the FCCs 907 may determine that a particular detected mode is associated with a collective and power setting at the rotorcraft's current flight weight, and may determine that adjusting the rotor speed and collective setting reduces the amplitude mode or eliminates the mode. In some embodiments where the pilot or automated system generates a control parameter that results in a flight parameter associated with an undesirable mode, the FCs may dampen or adjust the response to the control input to avoid the control parameter. For example, as the pilot raises the collective, if the collective input causes the collective setting, power setting torque setting, or the like, to cause an undesirable mode, the FCCs may adjust the response to the collective input by adjusting the torque/power/collective relationship to reduce the amplitude of the identified mode. In some embodiments, when the undesirable mode is created during a transient control input, for example, while increasing the collective to reach the control input as the collective is raised, the torque/power/collective relationship may be adjusted as the overall collective setting transits through the range causing the undesirable mode, and then, may be reset back to normal once the overall collective setting is no longer in a range that causes the undesirable mode. For example, when a cyclic stir excites a regressing scissor mode, a control adjustment that changes the rate at which the cyclic stir is implemented, that changes the frequency of the cyclic stir, or adds in cyclic noise to disrupt the regressing scissor mode may be generated when the system correlates the regressing scissor mode with the cyclic input. Thus, the onboard mode decomposition and compensation system 901 may provide real-time identification of fundamental modes and dynamic adjustment of rotorcraft parameters.

In other embodiments, the mode analysis system 913 uses the mode sensor data for the offline algorithm mode decomposition process. In some embodiments, mode analysis system 913 used the offline algorithm in addition to, or instead of, the real-time mode decomposition algorithm. For the offline algorithm, the mode analysis system 901 may retain all data generated by the sensors 905, and develop long term or accumulated mode analyses and correlations between the modes and rotorcraft parameters. The long term correlations between the modes and rotorcraft parameters may be used to adjust the rotorcraft parameters to avoid the undesirable modes identified by the offline algorithm. The adjustments made according to the offline algorithm may be permanent or semi-permanent, for example, by changing the response of one or more of the control actuators 911 to a particular pilot control movement or automated control command. For example, the mode analysis system 901 may determine that an undesirable mode is created by a particular rate of change of a cyclic, yaw, or collective control, and the mode analysis system 901 may instruct the FCCs 907 to attenuate a control input or automated control command to change command sent from the FCCs 907 to the control actuators 911 to avoid the identified, undesirable mode. Thus, the onboard mode decomposition and compensation system 901 may provide offline identification of fundamental modes and dynamic adjustment of rotorcraft parameters to, for example, tune the handling of a particular rotorcraft.

Figure 10:
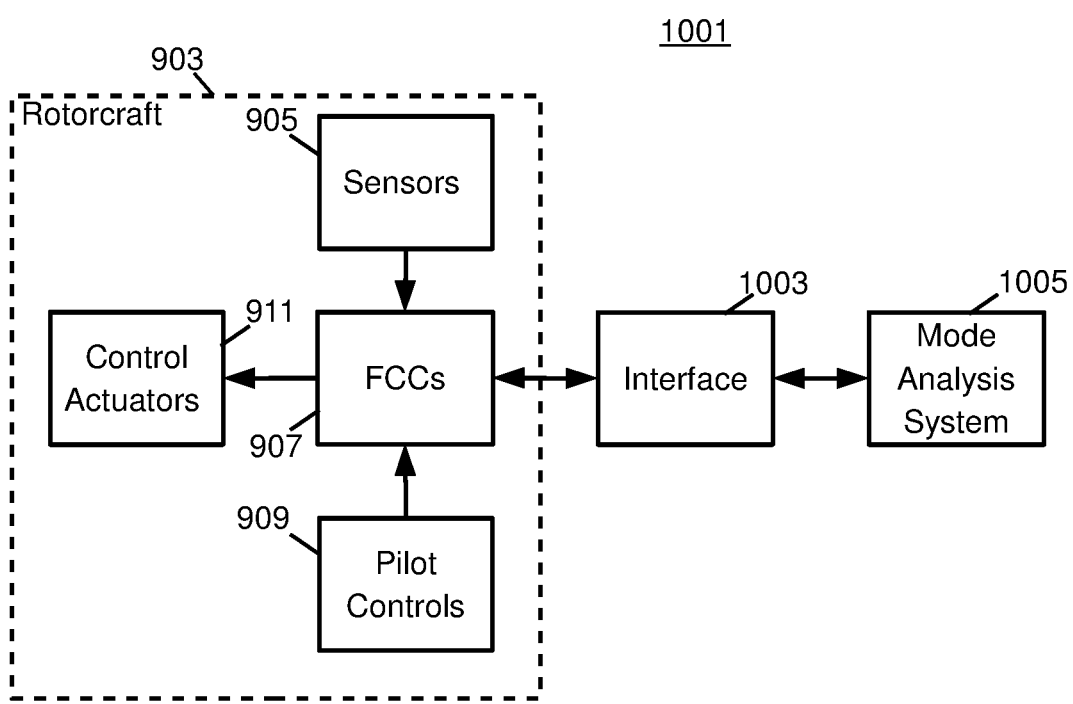
FIG. 10 is a diagram illustrating a remote mode decomposition and compensation system for a rotorcraft according to some embodiments.

FIG. 10 is a diagram illustrating a remote mode decomposition and compensation system 1001 for a rotorcraft 903 according to some embodiments. In some embodiments, a rotorcraft 903 may have a system that analyzes rotor modes or structural modes remotely using, for example, the offline mode decomposition system described above. In some embodiments, the decomposition and compensation system 1001 is partially disposed in the rotorcraft 903, and partially disposed outside of the rotorcraft 903. The decomposition and compensation system 1001 may include a mode analysis system 1005 that receives sensor data from the FCCs 907 through an interface 1003. The mode analysis system 1005 may be disposed remotely from the rotorcraft 903, and the interface 1003 may be, for example, a wireless or wired interface receives sensor data from the rotorcraft 903. In other embodiments, the mode analysis system 1005 may be a testing system that receives mode sensor data from one or more rotorcraft 903 for analysis during testing, validation, and customization of a rotorcraft 903.

In some embodiments, the FCCs 907 may store data received from the sensors 905 during operation of the rotorcraft 903, along with operation parameters of the rotorcraft 903 associated with each measurement taken by the sensors 905. Thus, the measurements taken by the sensors may be correlated with operating parameters that may indicate the cause of any detected modes. The FCCs 907 may send the sensor data to the mode analysis system 1005 through the interface automatically after the rotorcraft 903 returns to a maintenance facility, or may send the mode sensor data to the mode analysis system through a maintenance interface such as a maintenance laptop, server, or the like.

In some embodiments, the mode analysis system 1005 uses the mode sensor data, whether raw or processed, for the offline mode decomposition process. In some embodiments, the mode analysis system 1005 stores mode data from multiple operations or flights of the rotorcraft 903 for mode decomposition. Additionally, in some embodiments, the mode analysis system 1005 receives mode sensor data from multiple rotorcraft 903 for analysis of, for example, models or series of rotorcraft 903. The mode analysis system 1005 may perform the offline mode decomposition process on the received sensor data to generate mode decomposition results for a single rotorcraft, or for multiple rotorcraft. The mode analysis system 1005 may generate mode decomposition results based on mode sensor data from a single rotorcraft to identify modes generated by a specific rotorcraft, for example, as a result of maintenance, age, customization, or other factors specific to an individual rotorcraft. The mode analysis system 1005 may also generate mode decomposition results based on mode sensor data from multiple rotorcraft to identify modes generated by more than one rotorcraft, for example, as a result of model design factors, operating environment for the rotorcraft, rotorcraft fleet management, or other specific to similarly designed or commonly operated rotorcraft.

In some embodiments, the mode analysis system 1005 or the FCCs 907 may use the mode decomposition results obtained by the mode analysis system 1005 to generate correlation data that associates the determined rotor modes with one or more rotorcraft parameters. The mode analysis system 1005 may generate adjustment commands according to the correlation data and send the adjustment commands to the FCCs 907, or the FCCs 907 may receive correlation data from the mode analysis system 1005 and the FCCs 907 may generate adjustment commands according to the correlation data.

Figure 11:
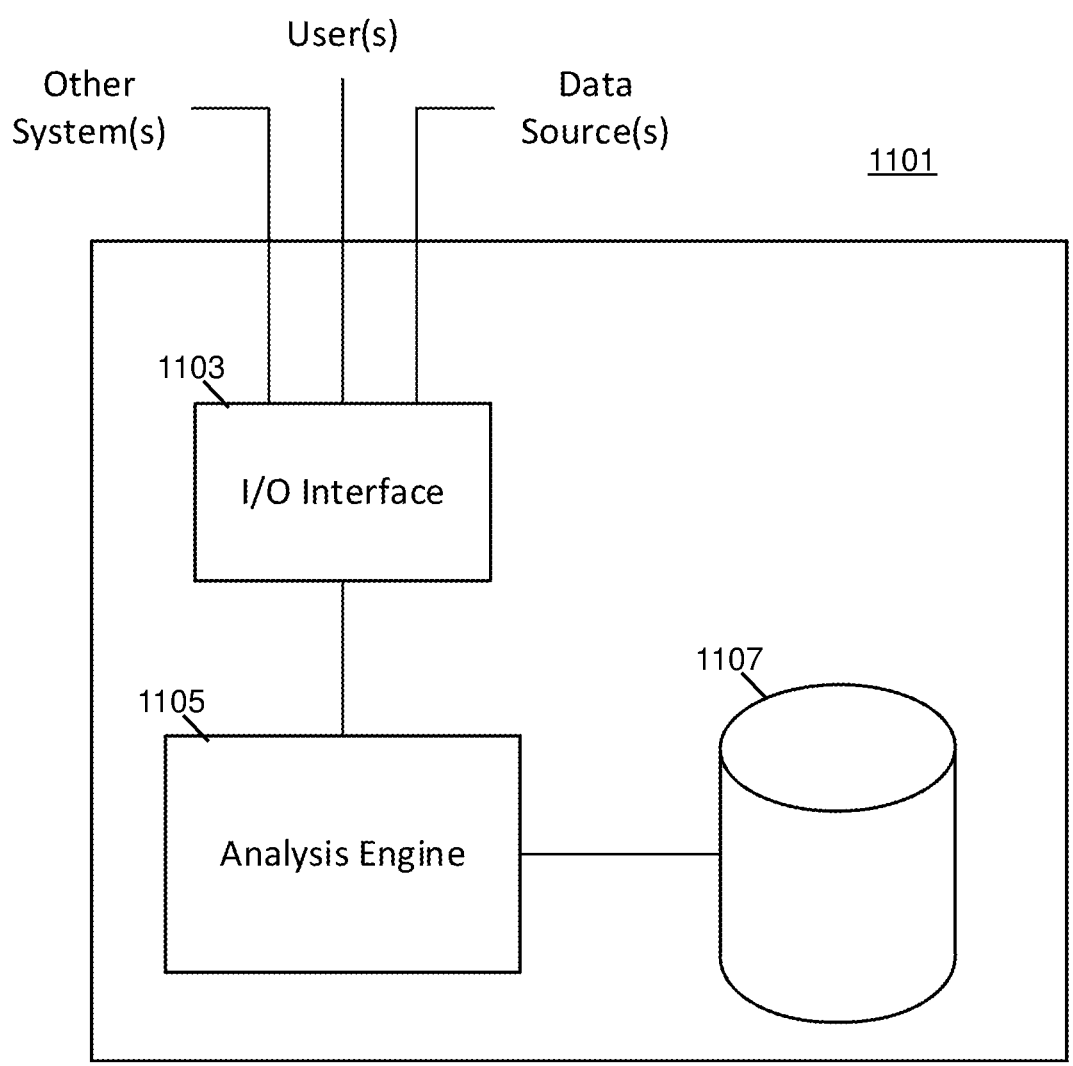
FIG. 11 illustrates a computer system for implementing the mode decomposition process according to some embodiments.

FIG. 11 illustrates a computer system 1101 for implementing the mode decomposition process according to some embodiments. The computer system 1101 may be FCCs or mode analysis systems, or the like, and may be configured for performing one or more functions with regard to the operation of the flight control system and the mode decomposition and compensation systems, as described herein. Further, any processing and analysis can be partly or fully performed by the computer system 1101. The computer system 1101 can be partly or fully integrated with other aircraft computer systems or can be partly or fully removed from the rotorcraft. The computer system 1101 can include an input/output (I/O) interface 1103, an analysis engine 1105, and a database 1107. Alternative embodiments can combine or distribute the I/O interface 1103, the analysis engine 1105, and the database 1107, as desired. Embodiments of the computer system 1101 may include one or more computers that include one or more processors and memories configured for performing tasks described herein. This can include, for example, a computer having a central processing unit (CPU) and non-transitory computer readable medium or non-volatile memory that stores a program or software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 1103 can provide a communication link between external users, systems, and data sources and components of the computer system 1101. The I/O interface 1103 can be configured for allowing one or more users to input information to the computer system 1101 via any known input device. Examples can include a keyboard, mouse, touch screen, and/or any other desired input device. The I/O interface 1103 can be configured for allowing one or more users to receive information output from the computer system 1101 via any known output device. Examples can include a display monitor, a printer, cockpit display, and/or any other desired output device. The I/O interface 1103 can be configured for allowing other systems to communicate with the computer system 1101. For example, the I/O interface 1103 can allow one or more remote computer(s) to access information, input information, and/or remotely instruct the computer system 1101 to perform one or more of the tasks described herein. The I/O interface 1103 can be configured for allowing communication with one or more remote data sources. For example, the I/O interface 1103 can allow one or more remote data source(s) to access information, input information, and/or remotely instruct the computer system 1101 to perform one or more of the tasks described herein.

The database 1107 provides persistent data storage for the computer system 1101. Although the term "database" is primarily used, a memory or other suitable data storage arrangement may provide the functionality of the database 1107. In alternative embodiments, the database 1107 can be integral to or separate from the computer system 1101 and can operate on one or more computers. The database 1107 preferably provides non-volatile data storage for any information suitable to support the operation of the flight control system 201 and the mode decomposition, including various types of data discussed further herein. The analysis engine 1105 can include various combinations of one or more processors, memories, and software components.

Figure 12:
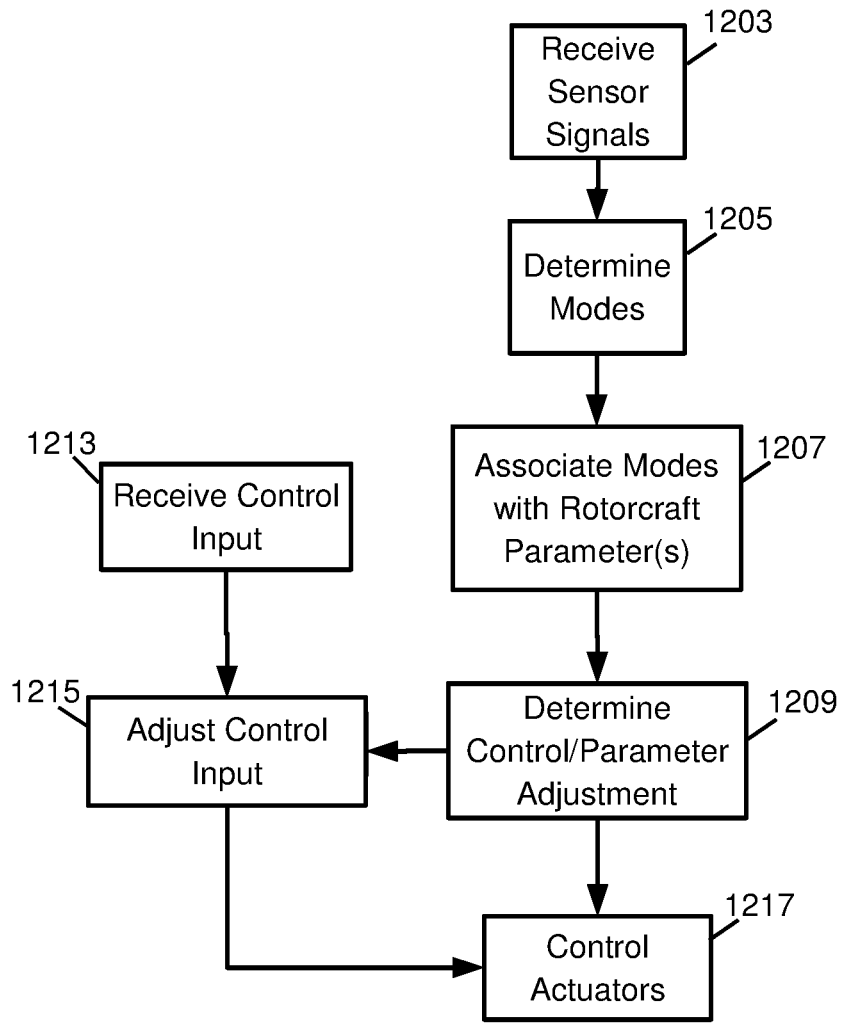
FIG. 12 is a flow diagram illustrating a method for determining modes and controlling a rotorcraft according to a correlation between a mode and a flight parameter according to some embodiments.

FIG. 12 is a flow diagram illustrating a method 1201 for determining modes and controlling a rotorcraft according to a correlation between a mode and a flight parameter according to some embodiments. In block 1203, sensor signals are received from one or more rotorcraft sensors. The sensor signals may be raw or processed mode sensor data received at the FCCs or at the mode analysis system from the sensors, or through the FCCs. In block 1205, the modes are determined from the sensor signals. In some embodiments, the mode analysis system perform the real-time or offline mode decomposition process on the received sensor signals to determine fundamental modes of structural elements associated with the sensors. In some embodiments, the sensors are lead-lag sensors that measure rotor blade movement parameters such as the displacement, force, acceleration or the like of rotor blades. In other embodiments, the sensors are displacement, acceleration, force, or vibration sensors on the fuselage or body of an aircraft that measure the vibration, movement or bending of the aircraft.

In block 1207, the modes are associated with one or more rotorcraft parameters. In some embodiments, the FCCs or mode analysis system correlates the determined fundamental modes with one or more rotorcraft parameters that may cause or attenuate the identified fundamental modes. Correlation data may be generated to indicate the mode and associated rotorcraft parameter. In block 1209, control or parameter adjustments are determined. In some embodiments, the FCCs or mode analysis system use the correlation data or the modes and associated rotorcraft parameters to determine the control or parameter adjustment. In some embodiments, the adjustment is a direct command to adjust a rotorcraft parameter. For example, where the rotorcraft parameter is an airspeed, rotor speed, collective setting, or the like, the adjustment may be an adjustment to increase or decrease the airspeed, adjust the rotor speed, collective setting, or the like. Additionally, the adjustment may include a compensating adjustment. For example, where a particular mode is associated with a collective setting, the adjustment may include a direct adjustment to increase the collective setting and a compensating adjustment may be to lower the rotor speed to achieve the same overall lift. In such an embodiment, the control or parameter adjustment is used to control one or more actuators in block 1217 to modify, adjust or control rotorcraft parameters of the rotorcraft.

In other embodiments, the adjustment is an attenuation, change or adjustment to a control input. For example, where the rotorcraft parameter is related to a control input, such as the amplitude of a control input, a rate of change caused by a particular control input, the rate of change of a control input, coupled control caused by a combination of control inputs, or the like, the adjustment may be a modification of the implementation of the control input by FCCs. For example, where a weather condition such as wind, or a flight parameter such as weight, causes a undesirable mode when the rotorcraft is at a particular forward speed, turn rate, descent rate, cyclic and collective setting, or the like, the adjustment may be to change the flight parameter to avoid the undesirable mode by attenuating or modifying how the FCC implements control commands causing the flight parameter. Thus, where a pilot has a cyclic and yaw input causing a particular turn rate, the FCC may attempt to change the turn rate to avoid the identified turn rate, or to adjust the collective, cyclic and yaw settings to maintain the turn rate with a different combination of flight control settings unless the pilot overrides the automatic adjustment. In such an embodiment, control inputs are received in block 1213, and in block 1215, the control inputs may be adjusted according to the control or parameter adjustment. The adjusted control input may then be implements, for example, by the FCCs, to control one or more actuators in block 1217 to modify, adjust or control rotorcraft parameters of the rotorcraft.

An embodiment system for providing control input adjustment for an aircraft includes one or more mode sensors disposed on an aircraft, a mode analysis system, the mode analysis system operable to receive mode sensor data from the one or more mode sensors, and operable to decompose the mode sensor data into decomposed mode data associated with fundamental modes of structural elements of the aircraft associated with the one or more mode sensors, and a flight control computer (FCC) disposed on the aircraft and connected to one or more actuators, the FCC operable to provide a control signal to the one or more actuators according to an association between the decomposed mode data and one or more rotorcraft parameters associated with the one or more actuators.

In some embodiments, the mode analysis system is further operable to transform the mode sensor data from a time domain into frequency domain mode sensor data, to generate decomposed frequency domain data by performing a frequency domain inverse transformation on the frequency domain mode sensor data, and to transform the decomposed frequency domain data into the decomposed mode data in the time domain. In some embodiments, the mode analysis system is further operable to perform the frequency domain inverse transformation by multiplying a first matrix having the frequency domain mode sensor data by an inverse transformation matrix, where a result of the multiplying is a second matrix having the decomposed frequency domain data. In some embodiments, the mode analysis system is operable to buffer the mode sensor data as the mode sensor data is received by the mode analysis system from the one or more mode sensors, and to use a real-time process to decompose the mode sensor data into the decomposed mode data. In some embodiments, the mode analysis system is disposed on the aircraft. In some embodiments, the one or more mode sensors comprises a plurality of mode sensors, where each mode sensor of the plurality of mode sensors is connected to a lead-lag damper on a rotor having a plurality of rotor blades, and is operable to measure a movement of a respective rotor blade of the plurality of rotor blades, where the decomposed mode data is decomposed rotor mode data associated with a plurality of modes of the plurality of rotor blades, and where the mode analysis system is operable to decompose the mode sensor data into the decomposed rotor mode data according to phasing of blades of the plurality of rotor blades. In some embodiments, a number of modes in the plurality of modes is the same as a number of rotor blades in the plurality of rotor blades. In some embodiments, the plurality of modes comprises at least a collective mode, a regressing cyclic mode and an advancing cyclic mode.

An embodiment mode analysis system includes a processor, and a non-transitory computer-readable storage medium storing a program to be executed by the processor. The program includes instructions for receiving mode sensor data from one or more mode sensors, the mode sensor data indicating movement of structural elements of a rotorcraft associated with the one or more mode sensors, decomposing the mode sensor data into decomposed mode data associated with fundamental modes of the structural elements, and providing, to a flight control computer (FCC) disposed on the rotorcraft and connected to one or more actuators, result data associated with the decomposed mode data.

In some embodiments, the program further includes instructions for generating correlation data that associates the fundamental modes with one or more rotorcraft parameters associated with the one or more actuators, and the result data is the correlation data, and providing the correlation data to the FCC causes the FCC to provide a control signal to one or more actuators according to the correlation data. In some embodiments, the result data is the decomposed mode data, and wherein providing the decomposed mode data to the FCC causes the FCC to generate correlation data that associates the fundamental modes with one or more rotorcraft parameters associated with the one or more actuators and further to provide a control signal to one or more actuators according to the correlation data. In some embodiments, the instructions for decomposing the mode sensor data into decomposed mode data include instructions for transforming the mode sensor data from a time domain into frequency domain mode sensor data, generating decomposed frequency domain data by performing a frequency domain inverse transformation on the frequency domain mode sensor data, and transforming the decomposed frequency domain data into the decomposed mode data in the time domain. In some embodiments, the instructions for generating decomposed frequency domain data include instructions to perform the frequency domain inverse transformation by multiplying a first matrix having the frequency domain mode sensor data by an inverse transformation matrix, where a result of the multiplying is a second matrix having the decomposed frequency domain data. In some embodiments, the program further includes instructions to buffer the mode sensor data as the mode sensor data is received from the one or more mode sensors, and the instructions for decomposing the mode sensor data include instructions for using a real-time process for decomposing the mode sensor data into the decomposed mode data. In some embodiments, the mode sensor data received from the one or more mode sensors indicates movement of lead-lag dampers associated with rotor blades on a rotor having a plurality of rotor blades, and the instructions for decomposing the mode sensor data into decomposed mode data includes instructions for decomposing the mode sensor data into decomposed mode data associated with a plurality of fundamental modes of the plurality of rotor blades according to phasing of blades of the plurality of rotor blades, where a number of modes in the plurality of fundamental modes is the same as a number of rotor blades in the plurality of rotor blades, and where the plurality of fundamental modes comprises a collective mode, a regressing cyclic mode and an advancing cyclic mode.

An embodiment method for controlling an aircraft includes receiving mode sensor data from one or more mode sensors, the mode sensor data indicating movement of structural elements of a rotorcraft associated with the one or more mode sensors, decomposing the mode sensor data into decomposed mode data associated with fundamental modes of the structural elements, providing, to a flight control computer (FCC) disposed on the aircraft and connected to one or more actuators, result data associated with the decomposed mode data, and providing, by the FCC, a control signal to the one or more actuators according to an association between the decomposed mode data and one or more rotorcraft parameters associated with the one or more actuators.

In some embodiments, the decomposing the mode sensor data includes transforming the mode sensor data from a time domain into frequency domain mode sensor data, generating decomposed frequency domain data by performing a frequency domain inverse transformation on the frequency domain mode sensor data, and transforming the decomposed frequency domain data into the decomposed mode data in the time domain. In some embodiments, the generating the decomposed frequency domain data includes performing the frequency domain inverse transformation by multiplying a first matrix having the frequency domain mode sensor data by an inverse transformation matrix, where a result of the multiplying is a second matrix having the decomposed frequency domain data. In some embodiments, the receiving mode sensor data from one or more mode sensor includes buffering the mode sensor data as the mode sensor data is received by the mode analysis system from the one or more mode sensors and the decomposing the mode sensor data into the decomposed mode data includes the decomposing the mode sensor data into the decomposed mode data using a real-time decomposition process. In some embodiments, the mode sensor data received from the one or more mode sensors indicates movement of lead-lag dampers associated with rotor blades on a rotor having a plurality of rotor blades, and the decomposing the mode sensor data into decomposed mode data includes decomposing the mode sensor data into decomposed mode data associated with a plurality of fundamental modes of the plurality of rotor blades according to phasing of blades of the plurality of rotor blades, where a number of modes in the plurality of fundamental modes is the same as a number of rotor blades in the plurality of rotor blades, and where the plurality of fundamental modes comprises a collective mode, a regressing cyclic mode and an advancing cyclic mode.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system for providing control input adjustment for an aircraft, the system comprising:
   one or more mode sensors disposed on an aircraft;
   a plurality of rotor blades, wherein each rotor blade of the plurality of rotor blades is attached to a yoke by a bearing;
   one or more lead-lag dampers, wherein each lead-lag damper of the one or more lead-lag dampers is associated with a rotor blade of the plurality of rotor blades, wherein each lead-lag damper is separate from the bearing associated with the respective rotor blade, and wherein each lead-lag damper is connected between the yoke of the aircraft and a control horn of the respective rotor blade, and wherein each lead-lag damper has a piston that extends or retracts to dampen movement of the respective rotor blade, wherein each mode sensor of the one or more mode sensors is connected to a respective lead-lag damper and is operable to measure a movement of a respective rotor blade by measuring movement of the piston of the respective lead-lag damper;
   a mode analysis system, wherein the mode analysis system is operable to:
      receive mode sensor data from the one or more mode sensors; and
      decompose the mode sensor data into decomposed mode data associated with fundamental modes of structural elements of the aircraft associated with the one or more mode sensors, wherein the decomposed mode data is decomposed rotor mode data comprising data of a plurality of modes of the plurality of rotor blades, wherein each mode of the plurality of modes is a structural mode of the fundamental modes of the structural elements of the aircraft associated with the one or more mode sensors, wherein the number of modes of the plurality of modes is the same as the number of rotor blades of the plurality of rotor blades, wherein the plurality of modes comprises as least a first order collective mode, a first order regressing cyclic mode and a first order advancing cyclic mode, and wherein the mode analysis system being operable to decompose the mode sensor data comprises the mode analysis system being operable to:
         transform the mode sensor data from a time domain into frequency domain mode sensor data;
         generate decomposed frequency domain data by performing a frequency domain inverse transformation on the frequency domain mode sensor data according to an inverse transformation matrix; and
         transform the decomposed frequency domain data into the decomposed mode data in the time domain; and
   a flight control computer (FCC) disposed on the aircraft and connected to one or more actuators, wherein the FCC is operable to provide a control signal to the one or more actuators according to an association between the decomposed mode data and one or more rotorcraft parameters associated with the one or more actuators.

2. The system of claim 1, wherein the mode analysis system is operable to transform the mode sensor data from the time domain into the frequency domain mode sensor data using a Fourier transform and to transform the decomposed frequency domain data into the decomposed mode data in the time domain using an inverse Fourier transform.

3. The system of claim 2, wherein the mode analysis system is further operable to perform the frequency domain inverse transformation by multiplying a first matrix having the frequency domain mode sensor data by the inverse transformation matrix, wherein a result of the multiplying is a second matrix having the decomposed frequency domain data.

4. The system of claim 1, wherein the mode analysis system is operable to buffer the mode sensor data as the mode sensor data is received by the mode analysis system from the one or more mode sensors, and to use a real-time process to decompose the mode sensor data into the decomposed mode data.

5. The system of claim 4, wherein the mode analysis system is disposed on the aircraft.

6. The system of claim 1,
wherein the mode analysis system is further operable to decompose the mode sensor data into the decomposed rotor mode data according to phasing of blades of the plurality of rotor blades.

7. The system of claim 1, wherein the mode analysis system analysis system is operable to decompose the mode sensor data into decomposed mode data according to:

$$R_p(\omega,t)=\Sigma^m_{k=1}(A_k(t)e^{i\theta_x(t)})(\Phi_{k,p}e^{i\alpha_{k,p}})$$

wherein $R_p(\omega, t)$ is a complex number representing a magnitude and phase of a response at location p, wherein m is a number of modes contributing to the p-th response location, wherein $A_k$ is an amplitude of the k-th mode response, $\theta_k$ is the phase of the k-th mode response, wherein $\Phi_{k,p}$ is an amplitude of the k-th mode shape at location p, wherein $\alpha_{k,p}$ is a phase of the k-th mode shape at location p, wherein t is time, wherein co is a frequency of the excitation and system response, and wherein $A_k(t)e^{i\theta_x(t)}$ and $\Phi_{k,p}e^{i\alpha_{k,p}}$ are complex numbers.

8. The system of claim 7, wherein a mode shape phase for a given blade and mode is described according to:

$$\alpha_{k,n}=-(n-1)*\Delta\theta_k$$

wherein $\alpha_{k,n}$ is a mode shape phase for the n-th blade due to the k-th mode.

9. A mode analysis system, comprising:
a processor; and
a non-transitory computer-readable storage medium storing a program to be executed by the processor, the program including instructions for:
receiving mode sensor data from one or more mode sensors, wherein the mode sensor data indicates movement of structural elements of a rotorcraft associated with the one or more mode sensors, wherein each mode sensor of the one or more mode sensors is connected to a respective lead-lag damper of a plurality of lead-lag dampers, wherein each lead-lag damper of the plurality of lead-lag dampers is associated with a rotor blade of a plurality of rotor blades attached to a yoke by a bearing, wherein each lead-lag damper is separate from the bearing associated with the respective rotor blade, and wherein each lead-lag damper is connected between the yoke and a control horn of the respective rotor blade, wherein the mode sensor data indicates measurement of a movement of a respective rotor blade associated with movement of a piston of a respective lead-lag damper as the piston that extends or retracts to dampen movement of the respective rotor blade;
decomposing the mode sensor data into decomposed mode data associated with fundamental modes of the structural elements, wherein the decomposed mode data is decomposed rotor mode data comprising data of a plurality of modes of the plurality of rotor blades, wherein each mode of the plurality of modes is a structural mode of the fundamental modes of the structural elements of the rotorcraft associated with the one or more mode sensors, wherein the number of modes of the plurality of modes is the same as the number of rotor blades of the plurality of rotor blades, wherein the plurality of modes comprises as least a first order collective mode, a first order regressing cyclic mode and a first order advancing cyclic mode, and wherein decomposing the mode sensor data comprises:
transforming the mode sensor data from a time domain into frequency domain mode sensor data;
generating decomposed frequency domain data by performing a frequency domain inverse transformation on the frequency domain mode sensor data according to an inverse transformation matrix; and
transforming the decomposed frequency domain data into the decomposed mode data in the time domain; and
providing, to a flight control computer (FCC) disposed on the rotorcraft and connected to one or more actuators, result data associated with the decomposed mode data.

10. The mode analysis system of claim 9, wherein the program further includes instructions for generating correlation data that associates the fundamental modes with one or more rotorcraft parameters associated with the one or more actuators; and
wherein the result data is the correlation data, and wherein providing the correlation data to the FCC causes the FCC to provide a control signal to one or more actuators according to the correlation data.

11. The mode analysis system of claim 9, wherein the result data is the decomposed mode data, and wherein providing the decomposed mode data to the FCC causes the FCC to generate correlation data that associates the fundamental modes with one or more rotorcraft parameters associated with the one or more actuators and further to provide a control signal to one or more actuators according to the correlation data.

12. The mode analysis system of claim 9, wherein the instructions for transforming the mode sensor data from the time domain into frequency domain mode sensor data include instructions for transforming the mode sensor data from the time domain into the frequency domain mode sensor data sing a Fourier transform; and
wherein the instructions for transforming the decomposed frequency domain data into the decomposed mode data in the time domain include instructions for transforming the decomposed frequency domain data into the decomposed mode data in the time domain using an inverse Fourier transform.

13. The mode analysis system of claim 12, wherein the instructions for generating decomposed frequency domain data include instructions to perform the frequency domain inverse transformation by multiplying a first matrix having the frequency domain mode sensor data by the inverse transformation matrix, wherein a result of the multiplying is a second matrix having the decomposed frequency domain data.

14. The mode analysis system of claim 9, wherein the program further includes instructions to buffer the mode sensor data as the mode sensor data is received from the one or more mode sensors; and wherein the instructions for decomposing the mode sensor data include instructions for using a real-time process for decomposing the mode sensor data into the decomposed mode data.

15. The mode analysis system of claim 9,
wherein the decomposed mode data is associated with a plurality of fundamental modes of the plurality of rotor blades according to phasing of blades of the plurality of rotor blades.

16. A method for controlling an aircraft, comprising:
receiving mode sensor data from one or more mode sensors, wherein the mode sensor data indicates movement of structural elements of a rotorcraft associated with the one or more mode sensors, wherein each mode sensor of the one or more mode sensors is connected to a respective lead-lag damper of a plurality of lead-lag dampers, wherein each lead-lag damper of the plurality of lead-lag dampers is associated with a rotor blade of a plurality of rotor blades attached to a yoke by a bearing, wherein each lead-lag damper is separate from the bearing associated with the respective rotor blade, and wherein each lead-lag damper is connected between the yoke of the aircraft and a control horn of the respective rotor blade, wherein the mode sensor data indicates measurement of a movement of a respective rotor blade associated with movement of a piston of a respective lead-lag damper as the piston that extends or retracts to dampen movement of the respective rotor blade;
decomposing the mode sensor data into decomposed mode data associated with fundamental modes of the structural elements, wherein the decomposed mode data is decomposed rotor mode data comprising data of a plurality of modes of the plurality of rotor blades, wherein each mode of the plurality of modes is a structural mode of the fundamental modes of the structural elements of the aircraft associated with the one or more mode sensors, wherein the number of modes of the plurality of modes is the same as the number of rotor blades of the plurality of rotor blades, wherein the plurality of modes comprises as least a first order collective mode, a first order regressing cyclic mode and a first order advancing cyclic mode, and wherein the decomposing the mode sensor data comprises:
transforming the mode sensor data from a time domain into frequency domain mode sensor data;
generating decomposed frequency domain data by performing a frequency domain inverse transformation on the frequency domain mode sensor data according to an inverse transformation matrix; and
transforming the decomposed frequency domain data into the decomposed mode data in the time domain;
providing, to a flight control computer (FCC) disposed on the aircraft and connected to one or more actuators, result data associated with the decomposed mode data; and
providing, by the FCC, a control signal to the one or more actuators according to an association between the decomposed mode data and one or more rotorcraft parameters associated with the one or more actuators.

17. The method of claim 16, wherein the transforming the mode sensor data from a time domain into frequency domain mode sensor data comprises transforming the mode sensor data from the time domain into the frequency domain mode sensor data using a Fourier transform; and
wherein transforming the decomposed frequency domain data into the decomposed mode data in the time domain comprises transforming the decomposed frequency domain data into the decomposed mode data in the time domain using an inverses Fourier transform.

18. The method of claim 17, wherein the generating the decomposed frequency domain data comprises performing the frequency domain inverse transformation by multiplying a first matrix having the frequency domain mode sensor data by the inverse transformation matrix, wherein a result of the multiplying is a second matrix having the decomposed frequency domain data.

19. The method of claim 16, wherein the receiving mode sensor data from one or more mode sensor comprises buffering the mode sensor data as the mode sensor data is received from the one or more mode sensors; and
wherein the decomposing the mode sensor data into the decomposed mode data comprises the decomposing the mode sensor data into the decomposed mode data using a real-time decomposition process.

20. The method of claim 16,
wherein the decomposed mode data is associated with a plurality of fundamental modes of the plurality of rotor blades according to phasing of blades of the plurality of rotor blades.

* * * * *